United States Patent
Vogler et al.

(10) Patent No.: US 12,548,647 B2
(45) Date of Patent: Feb. 10, 2026

(54) METHOD AND APPARATUS FOR PROCESSING OF MULTI-MODAL DATA

(71) Applicant: Bayer Aktiengesellschaft, Leverkusen (DE)

(72) Inventors: Steffen Vogler, Berlin (DE); Johannes Hoehne, Oranienburg (DE); Matthias Lenga, Leverkusen (DE)

(73) Assignee: BAYER AKTIENGESELLSCHAFT (DE)

( * ) Notice: Subject to any disclaimer, the term of this patent is extended or adjusted under 35 U.S.C. 154(b) by 284 days.

(21) Appl. No.: 18/288,963

(22) PCT Filed: Apr. 20, 2022

(86) PCT No.: PCT/EP2022/060347
§ 371 (c)(1),
(2) Date: Oct. 30, 2023

(87) PCT Pub. No.: WO2022/228958
PCT Pub. Date: Nov. 3, 2022

(65) Prior Publication Data
US 2024/0212811 A1    Jun. 27, 2024

(30) Foreign Application Priority Data
Apr. 28, 2021 (EP) .................... 21170844

(51) Int. Cl.
*G16H 15/00* (2018.01)
*G06V 10/774* (2022.01)
*G06V 10/776* (2022.01)
*G06V 10/80* (2022.01)
*G16H 10/60* (2018.01)

(52) U.S. Cl.
CPC .......... *G16H 15/00* (2018.01); *G06V 10/774* (2022.01); *G06V 10/776* (2022.01);
(Continued)

(58) Field of Classification Search
CPC ...... G16H 15/00; G16H 10/60; G06V 10/803; G06V 10/774; G06V 10/776; G06V 2201/03
(Continued)

(56) References Cited

U.S. PATENT DOCUMENTS

2020/0395117 A1* 12/2020 Schnorr ............... G16H 50/20
2021/0233273 A1*  7/2021 Spurr .................. G06F 18/217
(Continued)

OTHER PUBLICATIONS

Dippel, J. et al. (2021). "Towards Fine-grained Visual Representations by Combining Contrastive Learning with Image Reconstruction and Attention-weighted Pooling," Cornell University, arXiv:2104.04323v1. 1-9.
(Continued)

*Primary Examiner* — Allen H Nguyen
(74) *Attorney, Agent, or Firm* — MORRISON & FOERSTER LLP

(57) ABSTRACT

A method for training a machine learning model that is able to establish links between data of different modalities by creating a joint representation. In particular, application of the method to medical data including electronic medical records and medical images and/or other medical data. The trained machine learning model can among others fulfil tasks such as autocompletion of incomplete data, detection of uncertain and/or spurious data, generation of probable data and other tasks.

14 Claims, 10 Drawing Sheets

(52) U.S. Cl.
CPC ........... *G06V 10/803* (2022.01); *G16H 10/60* (2018.01); *G06V 2201/03* (2022.01)

(58) Field of Classification Search
USPC .......................................................... 382/128
See application file for complete search history.

(56) References Cited

U.S. PATENT DOCUMENTS

| | | | |
|---|---|---|---|
| 2023/0019211 A1* | 1/2023 | Wang | G06N 3/0464 |
| 2024/0115159 A1* | 4/2024 | Segal | G06N 3/09 |
| 2024/0394595 A1* | 11/2024 | Schierz | G06N 5/04 |

OTHER PUBLICATIONS

Feng, F. et al. (2014). "Cross-modal Retrieval with Correspondence Autoencoder," Beijing University of Posts and Telecommunication, 7-16.

Guo, W. et al. (2019). "Deep Multimodal Representation Learning: A Survey," IEEE Access, 7:63373-63394.

Joyce, T. et al. (2017). "Robust Multi-modal MRImage Synthesis," Miccai 2017, Part III, LNCS 10435, pp. 347-355.

Liu, X. et al. (2019). "Cross-Modality Feature Learning via Convolutional Autoencoder," ACM Trans. Multimedia Comput. Commun. Appl., 15(1s):1-20.

Ronneberger, O. et al. (2015). "U-net: Convolutional networks for biomedical image segmentation," in: International Conference on Medical image computing and computer-assisted intervention, Springer, 234-241.

Tian, J. et al. (2019). "Towards Automatic Diagnosis from Multimodal Medical Data," ML-CDS 2019/IMIMIC, LNCS 11797, pp. 67-74.

Tulder, G. et al. (2019). "Learning Cross-Modality Representations From Multi-Modal Images," IEEE Transactions on Medical Imaging, 38(2):638-648.

Wu, Y. et al. (2019). "Multi-modal semantic autoencoder for cross-modal retrieval," Neurocomputing, 331:165-175.

\* cited by examiner

METHOD AND APPARATUS FOR PROCESSING OF MULTI-MODAL DATA

CROSS-REFERENCE TO RELATED APPLICATIONS

This application is a national stage application under 35 U.S.C. § 371 of International Application No. PCT/EP2022/060347, filed internationally on Apr. 20, 2022, which claims the benefit of priority to European Application No. 21170844.1, filed Apr. 28, 2021.

FIELD

The following disclosure relates to the field of data analysis, in particular medical data analysis More specifically, the present disclosure relates to systems, apparatuses, and methods for processing in particular medical data stored in different modalities. In some embodiments, the disclosure relates to autocompleting missing information in medical data and detecting uncertain information by leveraging data from different modalities.

BACKGROUND

Modern medicine is characterized by aggregations of a wealth of data about any given patient. Often, this data covers various quantities of interest such as (but not limited to) the chemical composition of blood, structural properties of organs and bones captured in images obtained using various imaging techniques, and specific test results of varying levels of confidence. The data can assume one or more different modalities depending on which modalities are best suited for a type of quantities captured. Such modalities can be text, tables, diagrams, time series, images, 3D-representations, and/or others.

Often, despite the overall volume of available data from many patients, data about a single patient is sparse and spread across a multitude of modalities. As systematic and exhaustive tests are rarely carried out, gaps in the available data for a given patient are almost unavoidable. The medical practitioner may attempt to assess the patient's current health status based on this heterogeneous and incomplete array of previously acquired measurements and reports in the various forms they were documented in. Integrating all data is challenging; and therefore, as a result, much of this (already scarcely available) data is disregarded if it is not obviously relevant.

There ability to automatically generate of an overall picture of a patient that is as complete as possible based on the available data across multiple modalities could support medical practitioners and lead to better reproducibility in diagnosis. To date, the success of the analysis of the diverse sources of patient data is dependent on the experience, knowledge, and attention of an individual medical practitioner. This can cause data to be disregarded, overseen, and badly interpreted. In particular, data of different modalities (image, text, time series, diagrams, or others) may be difficult to integrate into a coherent diagnosis, particularly if, for every patient, different pieces of data are present and different pieces are missing.

Existing automated approaches for medical data analysis can solve sub-tasks of a medical practitioner's work such as classifying skin as cancerous or harmless, for example. While the data on a single patient is usually sparse, there exists a growing database carrying information about a large variety of different patients. By leveraging this wealth of data in a trained machine learning model, hidden interactions between different measurements in different modalities, different tests, and perhaps even between diseases may be revealed which are not necessarily apparent in their entirety to the medical practitioner. Based on such a trained machine learning model, the available data from a single patient may be put to much better use than it currently is. To date the challenge to integrate a wide array of different modalities of stored patient information such as images acquired by different imaging techniques, time-series such as cardiograms, and diagrams of various forms into a coherent virtual data model of the patient has not yet been addressed.

SUMMARY

There is need to achieve a fusion of data in different modalities and make the best use of the often sparsely available data in order to generate more complete patient reports that include text, images, and other data.

A technical problem solved by some embodiments of the subject matter is for example, among other things, the autocompletion of incomplete data. Available data for a given patient may be used to predict missing pieces of data. This may allow the execution of additional tests to be avoided and may require fewer images, volumetric data, audio recordings, graphs, other types of data, or combinations thereof need to be acquired. As a result, diagnosis may be accelerated and may become cheaper. In case of certain procedures such as X-ray where continued exposure should be avoided, the patient's health may benefit from less captured images.

Another problem solved by some embodiments of the subject matter is the identification and optionally the correction of incorrect parts of the existing data. Some embodiments may enable questionable parts of existing data to be classified as such. For example, an entry in an electronic medical record may be erroneous due to an error of a clinical practitioner. Some embodiments may detect such a mistake and make a user aware of it or even automatically detect it, a so-called autocorrection.

As will be seen in the following, some embodiments of the subject matter enable a particularly efficient use of all available data for training a machine learning model. Sparse, incomplete, and unlabeled data may be used.

In Some Embodiments, a Method is Disclosed, the Method Comprising:

obtaining input text data indicative of at least partially edited source text data for training of a machine learning model and input image data indicative of at least partially edited source image data for training of the machine learning model;

obtaining test text data indicative of at least partially unedited source text data for training of the machine learning model and test image data indicative of at least partially unedited source image data for training of the machine learning model;

generating a joint representation of the input text data and the input image data from the input text data and the input image data depending at least on one parameter influencing the machine learning model, wherein the joint representation enables deriving output text data and output image data;

generating output text data indicative of at least a part of the unedited source text data and output image data indicative of at least a part of the unedited source image data based, at least in part, on the joint representation of the input text data and the input image data, and depending at least on one parameter influencing the machine learning model;

evaluating the performance of the machine learning model by computing a first loss function indicative of a first deviation between the output text data and the test text data, and evaluating the machine learning model by computing a second loss function indicative of a second deviation between the output image data and the test image data.

This method may, for instance, be performed and/or controlled by an apparatus, for instance a server. Specialized hardware for the implementation of artificial neural networks may be used, such as field programmable gate arrays (FPGAs), memristor-based architectures such as crossbar structures, and other specialized semiconductor circuits. These types of hardware can be referred to as neural processing units. An apparatus comprising such specialized hardware may be referred to as a neural network device. The method of the first exemplary aspect may be performed and/or controlled by such an apparatus. Alternatively, this method may be performed and/or controlled by more than one apparatus, for instance a server cloud comprising at least two servers or a distributed system of multiple neural processing units. Alternatively, the method may for instance be performed and/or controlled by an electronic device, e.g. a mobile terminal or a medical device. For instance, the method may be performed and/or controlled by using at least one processor of the electronic device.

The method and/or the trained machine learning model may be performed and/or controlled on a first device or a first set of devices and provide results to a second single or multiple further device(-s) such as electronic devices, e.g. mobile terminals or a medical devices. In addition, the method may receive inputs from the second and/or a third device or devices.

In some embodiments, a computer program is disclosed which, when executed by a processor, cause an apparatus, for instance a server, to perform and/or control the actions of the method.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

In some embodiments, an apparatus is disclosed. The apparatus may be configured to perform and/or control the method or may comprise respective means for performing and/or controlling the method.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise the disclosed components, for instance means, processor, memory, or may further comprise one or more additional components.

A system is also disclosed, the system comprising an apparatus according to the above and an electronic device, wherein the electronic device is configured to receive inputs and/or output from the apparatus.

BRIEF DESCRIPTION OF THE FIGURES

The invention will be described, by way of example only, with reference to the accompanying drawings.

DETAILED DESCRIPTION

Figure 1:
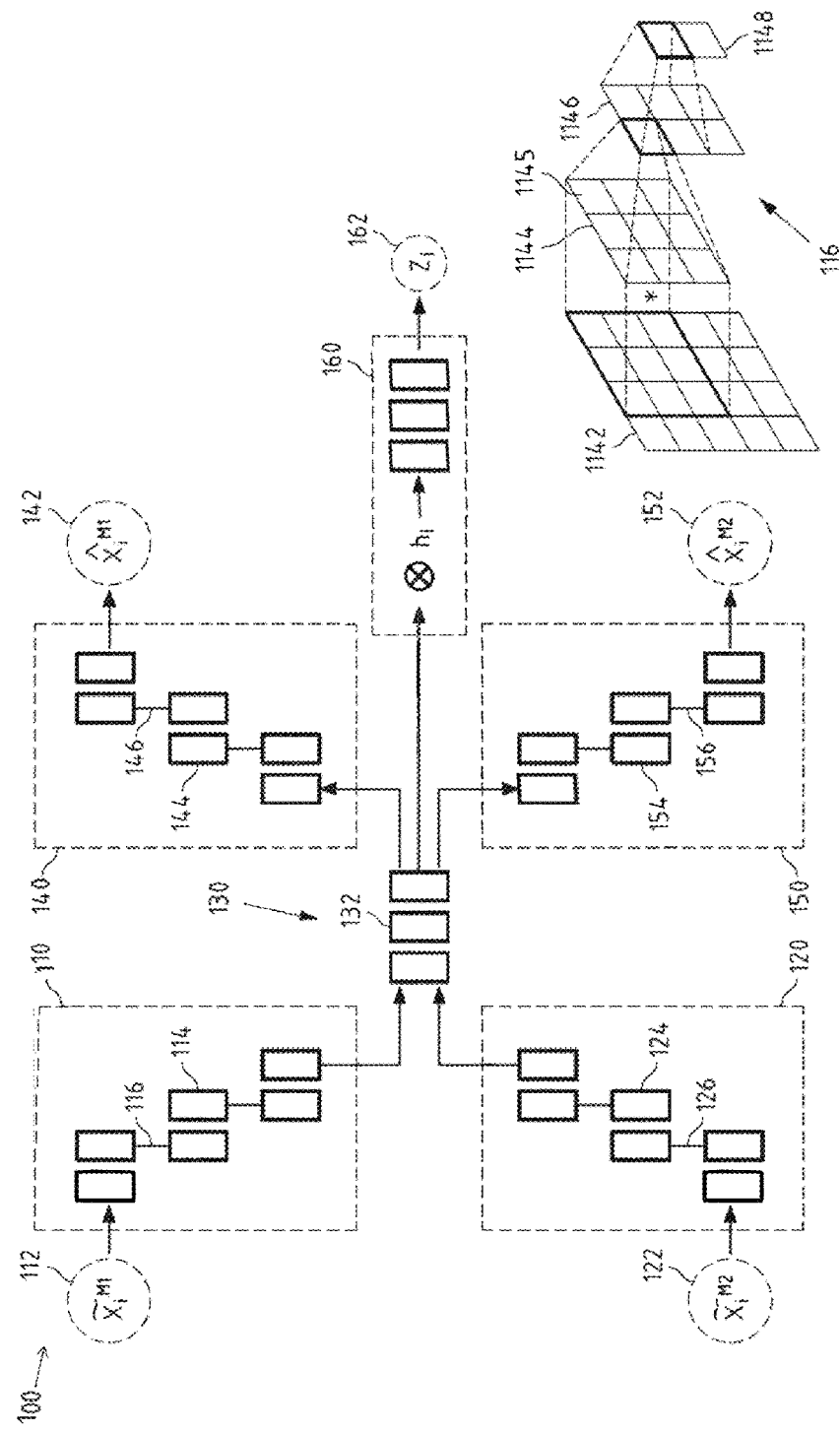
FIG. 1 shows a schematic block diagram of a machine learning model, according to some embodiments.

In the following, exemplary features and exemplary embodiments of all aspects will be described in further detail.

Input data may be obtained by a machine learning model. The input data may be prepared to train a machine learning model, e.g., in advance. Such a machine learning model, as used herein, may be understood as a computer implemented data processing architecture. The machine learning model can receive input data and provide output data based on that input data and the machine learning model, in particular the parameters of the machine learning model. The machine learning model can learn a relation between input and output data through training. In training, parameters of the machine learning model may be adjusted in order to provide a desired output for a given input.

For example, a machine learning model may comprise an artificial neural network. An artificial neural network comprises artificial neurons. These artificial neurons may be structured into multiple layers, a layer comprising at least one or multiple artificial neurons. Pairs of artificial neurons may be connected through edges. An edge is to be understood as a directed connection from a first artificial neuron to a second artificial neuron. Such edges may have a weight associated with them. The weight determines the impact of an upstream artificial neuron from which an edge projects on a downstream artificial neuron that receives input from the upstream artificial neuron. A single artificial neuron may receive inputs from one or more upstream artificial neuron. A single artificial neuron may transmit its output to one or multiple downstream artificial neurons. A neural network can have a feed forward structure in which there are no recurring connections from a given layer to any upstream layer. In particular, any given neuron of a given layer may, for example (e.g., only), project through edges to the next downstream layer. An artificial neural network may receive inputs in an input layer and provide an output in an output layer. Often, many so called hidden layers are located between the input and the output layer. In a variant, in at least one hidden layer, multiple or even all artificial neurons of that layer may receive inputs from the same number of neurons of the upstream layer respectively. At least a subset of the weights in the artificial neural network may be changed during training of the artificial neural network. The weights may be, among other things, parameters of the model. The weights may be changed by using backpropagation. Backpropagation can be summarized as calculating an error based at least in part on the output of the artificial neural network. That error is propagated back through the network from the output layer through to the input layer and the weights may be adjusted in order to reduce the error based at least in part on the output.

The step of obtaining data may for example be understood as obtaining of the data itself, and/or obtaining a reference to the data which enables the obtaining of the data itself. Obtaining may in addition or in the alternative be understood as receiving an access right that makes it possible to receive the data itself or a reference to it. The obtaining may be active in that the method according to the first exemplary aspect triggers the obtaining (e.g., retrieving) of the data itself or a reference to the data. The obtaining may in addition or in the alternative be passive such that the method according to the first exemplary aspect receives the data, for example without requesting data or without requesting the particular piece of data obtained. Obtaining may further mean to keep data previously obtained such as for example keeping data in a memory.

Data, as used herein, may for example be understood as any representation that comprises information. Such data can take various representations such as, but not limited to, a text, an image, an audio recording, a diagram, a color, a vector, a matrix, a tensor, a voltage, a magnetization or many other representations. Representations may be combined to form data of multiple representations. Usually information can be obtained from data regardless of the representation. This may allow that data in two different representations can comprise (e.g., contain) the same information. For example, the outcome of a pregnancy test can be represented by a picture of the test unit with a certain color indicating the test result or it can alternatively represented by a line of text saying "This person is pregnant.". It may also be a circle with a check mark in it at a certain position of a structured form, it may alternatively be a 1 as opposed to a 0 in the memory of a computer, mobile device, server, or the like. All these data comprise the same information but in different representations.

Data may, for example, be indicative of other data. Data may in addition or in the alternative be indicative of objects such as physical objects, texts, images, abstract concepts, references to data and/or objects. If data is indicative of something it may mean that the data comprises information about something. It may in addition or in the alternative mean that the data at least partially depends on something, for example image data that is derived from an image taken of a tree is indicative of the tree. The image data in this example may also be indicative of the abstract concept of a tree. It may also be indicative of the text of a note pinned on the tree. The actual image data and text data, as used herein, are explicitly defined in more detail below.

Information may for example be defined as a level of uncertainty, e.g., that it resolves. For example, the outcome of a COVID19-test resolves the uncertainty whether a person has been infected by COVID19.

Representations of data may be converted into each other. For example, a test result represented by a color of a chemical compound may be converted into a note of a medical practitioner. Many different changes in representation of a given data comprising information are possible. For example, a text may be represented as an image of a hand-written note. It may, for example, be converted to a series of digital symbols by an optical character recognition (OCR). Then, it may be for instance transformed to a vector of numbers. An image may be represented by the level of light-induced color changes of a light-sensitive layer of a photographic paper, may then, e.g., be scanned to be represented as a digital image of any encoding such as and an RGB bitmap. A digital image may then for example be rearranged to a 1D-vector.

It is, for example, possible to transform data from a first representation into another representation while substantially or entirely preserving the information of the original data. An example may be a rearrangement of a 2D image matrix to a 1D vector, and vice versa.

A transformation of one representation into another one may for example be accompanied by a loss of information. An example would be converting an image of a test tube containing a chemical compound that changes color depending on the test result to a single bit that reports whether the outcome was positive or negative. All information other than the test result is lost in this case, e.g., information about the type of test that may still have been discernible from the image.

First data and second data in a first and a second representation respectively, may be combined to or into a single piece of data. For example, two vectors may be concatenated to a single vector. As another example, two digital images of the same number of pixels at least along one of two dimensions can be concatenated to a single image.

When two or more originally disjoint pieces of data are combined to one piece of data, they form a joint representation. Such a joint representation may comprise (e.g., contain) essentially, e.g., all or most of the information comprised (e.g., contained) in the individual pieces of data that the joint representation was derived of. The joint representation may also comprise (e.g., contain) a part of the information included in both or one of the individual pieces of data.

For example, such one or more joint representations may be obtained from two or more pieces of data which may be of different modalities such as image, text, diagrams, graphs, audio, and others. It may for example be necessary, to first convert a respective piece of data of a modality to an intermediate representation. In a second step, a joint representation from the intermediate representations of different pieces of data may be generated. For example, text data in a first representation such as an arrangement of letters may be transferred to a vector-representation (see below for exemplary methods). Image data in a first representation such as a two-dimensional arrangement of pixels may also be transferred to a vector-representation (see below for exemplary methods). In the intermediate vector representations, both pieces data of different modalities may be combined to a joint representation that may for example be another vector.

Combination(s) of (e.g., at least two) representations to generate a joint representation may in case of vectors and/or matrices and/or tensors for example be achieved by a concatenation, a multiplication, an addition, for example an element-wise addition, a cross-product, and many other procedures. Two or more pieces of text data may for example be concatenated as well, e.g., mixed sentence by sentence, paragraph by paragraph, or in different portions of the text data and/or in combinations thereof. Two or more pieces of image data may for example be combined in analogous fashion to matrices and/or concatenated, interlaced by image line or by image column, added in an element-wise fashion, or combinations thereof. Various forms of combining representations are possible, wherein a respective type of combination may in some cases depend on the representations of the data to be combined.

A representation of data may for example be human-readable like an image or a text. It may in addition or in the alternative be (e.g., purely) machine-readable like a bit stream of a modern video encoding algorithm that can hardly be decoded by a human observer.

Often, a data representation may, for example, be linked to an encoder that receives a first representation and creates a second representation. It is for example possible that additionally, a decoder exists that transforms the second representation back to the substantially same first representation. For example, the encoder and/or decoder may transform the data with and without loss of information. An example of an encoder would be to transform an image stored in the bitmap format to another representation such as an image stored in JPEG format. In this case, the transformation may be accompanied by a loss of information. A decoder may then for example decode the image back into bitmap format, or directly convert it into commands received by graphic card (another possible representation) to control a monitor to show the information stored in the second transformation to a user. In another example according to all exemplary aspects, an encoder may involve a convolution of data in a one-, two-, three- or higher-dimensional array with a convolutional kernel to generate convolved data. For example, a two-dimensional matrix may be convolved by a filter kernel of a size smaller than the matrix. The result may for example be another two-dimensional matrix. Depending on the filter kernel, information may be lost in this transformation by the convolution. It is also possible that the information is substantially preserved by the transformation. If the filter kernel has a single non-zero entry for example, all information will be preserved (possible except edges of the original matrix). If all entries of the filter kernel are the same, information may be lost in the averaging functionality implemented by the filter. A loss of information may be compensated by applying multiple convolution kernels to the same array and generating multiple pieces of convolved data.

In one example, text data may, for example, be understood as a representation of data comprising information, in particular information about a text. Text data may additionally comprise information about data in other modalities such as image, audio, graphs, diagrams, or other modalities. Text data may comprise information that may by itself be sufficient to resolve a given uncertainty. The information comprised in text data may in addition or in the alternative require information from other data to resolve a given uncertainty. The text data may comprise (e.g., contain) references to other data which can for example also be a representation of text data or may be of another modality such as diagrams, time series, images and/or others.

A text can for example be understood as an arrangement of letters and/or digits. Letters may not be confined to Latin letters but can comprise other types of letters such as for example Arabic letters, Korean syllables, Chinese ideograms or any other alphabet. It will be understood that this list is purely illustrative and non-limiting. Digits may be Arabic or Latin or belong to any other digit system.

Text can further be understood as a representation of, for example, words, sentences, lists, tables, equations, or a combination thereof, to name but a few non-limiting examples. Text data can for example be structured into multiple lines, columns, pages, folders, binders or in other parts, or any combination thereof.

It is to be understood that text data may for example comprise any representation comprising at least some information about a text and/or any representation that is transformable to a representation comprising text. Text data can for example in addition or in the alternative be understood as any representation that is at least partially derived from and/or can at least partially be transformed in an arrangement of letters and digits. A variety of different representations is imaginable including, but not limited to, a hand-written report, a machine-written text, a form, a line of code and/or combinations thereof. Text data can also be a bit stream of ones and zeros, a vector containing floating point numbers and/or integers, a matrix, a tensor or combinations thereof. Text data may for example be taken the form of an image of a hand-written note or may for example be a (e.g., 8 bit) greyscale image in which the intensity of a respective pixel value represents a letter of the alphabet.

Text data may comprise information about multiple texts. Text data may comprise multiple different representations.

Text data may, for example, be generated from a text or data that comprises information about a text. Such a generation may be, e.g., a transformation which may for example be achieved by means of a text data encoder. The generated representation may for example comprise a vector, matrix and/or tensor. A text data encoder may for example involve a step of removing parts of a text that, e.g., does not carry any information of interest such as artifacts of a mark-up language, other bits of formatting, header and footers of a document or other parts which may not be relevant to a given purpose of the text data. It may for example additionally or alternatively involve the step of tokenization, e.g., which may comprise that the sentences, equations, indeed the entire or part of the text may be segmented into smaller elements. A respective element may be called a token. Such tokens may for example be sentences, words, syllables, entire or partial sentences, single symbols and/or other pieces of text data and/or combinations thereof. Other steps which may for example be performed may comprise a transformation of segmented/tokenized text into another form which may for example be a bag of words representation that discards the order of words. A simple example of converting a tokenized/segmented text into a vector representation is to count the occurrences of a respective unique token. For example, the sentence "Anne ate soup with the soup spoon of Anne." May be represented as a list of tokens of arbitrary order with an individual count as follows: "Anne": 2, "soup": 2, "ate": 1, "with": 1, "the": 1, "spoon": 1, resulting in an exemplary vector (2, 2, 1, 1, 1, 1). A fixed set of vocabulary may for example be allowed and tailored to the type of data expected by the text data encoder. The text data encoder may comprise computing similarities of unknown words to known words and finding closest matches. Counts may be given as absolute values or for example relative to the total number of tokens in a text or may for example undergo a transformation such as a logistic transform. After such an example transformation or any other transformation that converts a text to a vector, the text data of two transformed texts can be processed using vector algebra. For example, the similarity of two pieces of text data may be assessed by a distance metric such as a Euclidian and/or cosine distance, a correlation measure or the like.

In another example embodiment of a method to transform text to a vector representation, a look-up-table may be provided that transforms words to learned vectors. A part of a machine learning model may learn a suitable vector for a word encountered. This approach may for example be used in the embedding layer of so-called "transformers".

As can be seen, text data may be transformed to various different representations. The text data may be obtained by the machine learning model in a representation that the text data has first been transformed to. This may facilitate and/or enable the use of a certain machine learning model. For instance, a machine learning model that takes vectors, matrices, tensors or similar arrays as an input, may obtain text data that has been transformed to such a representation. A machine learning model obtaining an array may for example be an artificial neural network.

Text data may in one example comprise information about some aspect of a human's health. To name a few non-limiting examples, this information can pertain to an internal body parameter such as blood type, blood pressure, cholestenone, resting heart rate, heart rate variability, vagus nerve tone, hematocrit, sugar concentration in urine, or a combination thereof. It can describe an external body parameter such as height, weight, age, body mass index, eyesight, or another parameter of the patient's physique. Further exemplary pieces of health information comprised (e.g., contained) in text data may be medical intervention parameters such as regular medication, occasional medication, or other previous or current medical interventions and/or other information about the patient's previous and current treatments and reported health conditions. Text data may for example comprise lifestyle information about the life of a patient, such as consumption of alcohol, smoking, and/or exercise and/or the patient's diet. The data is of course not limited to physically measurable pieces of information and may for example further comprise psychological tests and diagnoses and similar information about the mental health. In another example, text data may comprise at least parts of at least one previous opinion by a treating medical practitioner on certain aspects of the patient's health. Text data may in addition or in the alternative comprise (e.g., contain) references and/or descriptions of other sources of medical data such as other text data and/or data of other modalities such as images acquired by a medical imaging technique, graphs created during a test and/or combinations thereof.

In one example, text data may at least partly represent an electronic medical record (EMR) of a patient. An EMR can, for example, comprise information about the patient's health such as one of the different pieces of information listed in the last paragraph. It is not necessary that every information in the EMR relates to the patient's body. For instance, information may for example pertain to the previous medical practitioner(s) who had contact with the patient and/or some data about the patient, assessed their health state, decided and/or carried out certain tests, operations and/or diagnoses. The EMR can comprise information about a hospital's or doctor's practice they obtained certain treatments and/or underwent certain tests and various other meta-information about the treatments, medications, tests and the body-related and/or mental-health-related information of the patient. An EMR can for example comprise (e.g. include) personal information about the patient. An EMR may also be anonymized so that the medical description of a defined, but personally un-identifiable patient is provided. In some examples, the EMR contains at least a part of the patient's medical history.

In one example embodiment of all exemplary aspects of the subject-matter, image data may for example be understood as any representation of data comprising at least some information about an image and/or any representation that is transformable to a representation comprising at least part of an image. Image data may additionally comprise information about data in other modalities such as text, audio, graphs, diagrams and/or other modalities and/or combinations thereof.

An image can for example be any one-, two-, three- or even higher dimensional arrangement of data entries that can be visualized in a way for a human observer to observe it. An image may for example be understood as a description of a spatial arrangement of points and/or the coloring, intensity and/or other properties of spatially distributed points such as, for example, pixels in a (e.g. bitmap) image or points in a three-dimensional point cloud. A non-limiting example of one-dimensional image data can be representations of test-stripes comprising multiple chemically responsive fields that indicate the presence of a chemical. Non-limiting examples of two-dimensional image data are two-dimensional images in color, black and white, and/or greyscale, diagrams, or schematic drawings. Two-dimensional images in color may be encoded in RGB, CMYK, or another color scheme. Different values of color depth and different resolutions may be possible. Two-dimensional image data can for example be acquired by a camera in the visual spectrum, the infrared spectrum or other spectral segments. Procedures such as X-ray scans can be applied and/or microscope images and various other procedures for obtaining two-dimensional image data. Non-limiting examples of three-dimensional image data are computed tomography (CT) scans, magnetic resonance imaging (MRI) scans, fluorescein angiography images, OCT (optical coherence tomography) scans, histopathological images, ultrasound images or videos comprising a sequence of two-dimensional images with the time as a third dimension. A non-limiting example of four-dimensional image data could be an ultrasound computer tomography video in which a three-dimensional scan is captured at different times to form a sequence of three-dimensional images along a fourth axis, e.g., time.

In particular, image data may, for example, be radiology data.

Image data may, for example, comprise any representation comprising at least some information about an image and/or any representation that is transformable to a representation comprising at least a part of an image. Image data can for example be understood as any representation that can at least partially be transformed to an arrangement of points. Image data can comprise information about multiple images. Image data can comprise multiple different representations. Image data may further comprise data in a different modality than image. Image data may be generated from an image or data that comprises information about an image. Such a transformation may for example be achieved by means of an image data encoder. An image data encoder may for example transform the two-dimensional matrix of a color image with three channels into three one-dimensional vectors, or for example into a single one-dimensional vector. Another possible transformation may be to merge different color channels to a single intensity value per pixel.

Image data may for example be transformed from one representation into another transformation by means of suitable encoders called filters. A filter can, for example, be realized by a convolutional filter kernel that is applied to at least parts of the image data in order to generate a new representation of the image data. A convolutional filter kernel may be applied to the image by computing the convolution for a given start position, then shifting the position of the convolution kernel by at least one element to the left, right, up or down and applying the convolution again, then shifting again, etc. This procedure may be continued until most of or the entire image has been convolved with the filter kernel; that is, until most entries of the image have been multiplied by the central entry of the filter kernel, e.g. at least once, possibly except for entries close to the image edge. A filter may thus be understood as an encoder that transforms image data from one representation to another. A filter can transform image data with and without loss of information.

An example of a filter kernel is a vector and/or matrix and/or tensor comprising (e.g., containing) filter coefficients. A first may for example be an edge detector of a given orientation, a Gabor filter of a certain orientation and frequency, a basis function of a cosine transform, or any other filter kernel. Image data may thus be represented as the outcome of a filter. The filter outcome may take the form of image data and may be transformable to a representation a human can observe. Multiple filters can be applied to the image data to generate multiple representations of the same image data. In this way, for example, a representation of the image may be generated that can be seen as a list of outcomes of filters. If, for example, to a given image of 100 pixels, 100 filters are applied, each of these filters yielding a single outcome, the entire image may be represented by the 100 filter outcomes. If additionally, each filter kernel of the exemplary applied filters is orthogonal to all other filter kernels, such as is the case for example for basic functions of a cosine transform, the image data in the representation of a filter outcome may comprise (e.g., contain) substantially the same information as the image data before transformation using a filter. Both representations are image data in the context of the subject matter. That is, both are representations that are transformable to an image and in this case both are also derived from an image.

As used herein, text and image may be understood as different modalities. Other than text and image, many more different modalities such as audio recordings and in a more general sense time series and many more types of information content may as well be considered such a modality. The sources of different modalities and/or their information contents may often differ. These differences can for example be routed in the different ways of acquiring different modalities such as text data and image data.

Often the most common and "native" representations chosen for data of different modalities, such as image data and text data for example, may differ as well. For example, a text data comprising information about a text will most often simply be a text file comprising (e.g., containing) sentences encoded in a character encoding such as ASCII. Images on the other hand may for example be encoded as a matrix of intensity values, e.g., a bitmap.

Different modalities of data may to a certain extent require different procedures for processing and analyzing them. For example, the processing of data may serve the purpose of extracting a desired information from it. These differences in processing of different modalities may at least partially be routed in their respective representations. As representations can be transferred to another, it may at least in some cases be possible to transfer data from one modality in a first representation to a second representation, wherein the second representation may (e.g., usually) be encountered for another modality. For example, text may be converted to a matrix of values that (e.g., each) represent a letter. In the consequence, it may for example become possible to treat data from two different modalities using the substantially same processing techniques, simply by aligning their representations. Data from two or more different modalities may (e.g., each) be transferred to a common representation that may then be treated similarly for all pieces of data. An example would be to transform text data from a continuous text to a vector and image data from a bitmap to a vector. Both may be treated by similar processing steps after transformation.

It may be impossible to derive the modality of given data just from the type of representation. It may, however, for example be possible that data in one representation may be converted to a first representation that is usually encountered for a first modality, such as an arrangement of letters. It may at the same time be possible to transform the same data to another second representation that is usually encountered for a second modality, such as a two-dimensional arrangement of pixels.

Data may change its modality. Data and/or the information comprised by data may at least partially be transferred from one modality to another modality.

It may be possible to represent data of different modalities in the same representation. For example, an ultrasound image captured from a patient's breast may show a dark spot (modality: image), a biopsy of the affected region may under the microscope show a certain structure of the flesh (modality: image), a peak in the spectrum of a mass spectrometer may indicate the presence of a certain biomarker in the blood (modality: diagram), a color of chemical compound may show the presence of a biomarker in the blood (modality: image), written report may include a sentence "The patient has breast cancer." (modality: text) or, a single bit in a computer's memory may be a 1 instead of a 0. A respective representation respectively the last representation at least partly comprises the information of all other representations from various modalities.

In an example, it may well be possible that data in two different modalities at least partially share information, e.g., a substantially same piece of information may be obtained from both pieces of data. It is for example possible that information is shared between image data and text data. This may for example mean that image data comprises information about an image which is described in the text that the text data comprises information about. As a more concrete example, a medical practitioner may have analyzed the image about which the image data comprises information and may have written a report on this analysis of the image as a text that the text data comprises information about. It may even go that far that a report about an image is that detailed and rich in information that the information content about a certain part of an image is (e.g., almost entirely) comprised in a text passage.

In a wider sense, data from two or more (e.g. different) modalities may comprise information about the same object and without necessarily relating directly to one another (as in a report based on an image). The data may be mutually informative of another. For example, text data and image data may be at least weakly mutually informative of another. Mutual information may simply be caused by the source of information. The object in this case may be the same for multiple pieces of data in different modalities. For example, an image of a body region (data in the modality image) of the patient may allow an approximate estimation of the patient's age that can be read in a patient report (data in the modality text). Or for example, an information in text data such as a patient report about an organ dysfunction may enable the prediction of an unusual tissue color captured in image data.

It is for example possible to regard an object that is observed, for example a patient, as a source of information. It is possible that two pieces of data, e.g., text data and image data, respectively comprise a subset of the overall available information about the object, such as a patient for example. These two subsets of information may overlap to a variable degree or they may be entirely disjoint. For example, both image data and text data may comprise information about the same object, e.g., a patient, and thus information from the same source. In some cases, at least a part of the information comprised by the text data is substantially identical and/or has a high similarity and/or is highly informative of at least a part of the information comprised by the image data. Other parts of the information comprised by the image data may not be present in the text data, or vice versa. Some information about the object such as a patient may not be present in either text data or image data.

Data, be it image data, text data, or some other data for example from another modality may lack one or more particular pieces of information. Such data can be regarded as incomplete. Indeed it may in many cases be virtually impossible for data to comprise (e.g., contain) all the information there is available from a given data source. In the case of a patient, for example, hundreds of thousands of different tests, image sources, etc. are available. Already from there, it can be seen as practically impossible to carry out all available tests on a patient. But even if all these tests were to be carried out on a single patient, most of the information that can theoretically be derived from the body and its myriad of cells and their interactions, is virtually impossible. Medical data can thus always be regarded as incomplete.

Data may be incomplete to a varying degree. Data may for example be incomplete to a mild degree, e.g., it is for example possible that a part of image data is absent due to, for example, a misplaced lead protection during capture of an X-ray scan or due to a slightly misaligned camera of a photograph. It is possible that data is more severely incomplete. For example, image data of a region of interest may be missing entirely or certain image data may be available but it has been captured by a not suitable imaging technique such as MRI instead of CT. All the same for text, for example, certain passages of text comprising (e.g., containing) information about a patient may have been lost, a line may have been blurred before it was digitized, or a certain test may not have been applied yet and the results are thus missing in the data.

In some cases, the information comprised in the incomplete data may in fact enable an estimation of the missing information in the same incomplete data.

For example, results of a first test that has already been carried out in a patient and of which the results are comprised in text data may be expected to be correlated to the result of a second test which has not yet been carried out. The missing result of the second test may be estimated on the basis of the result of the first test and some knowledge about the correlation.

For example, in image data as well, missing pieces of that data may be possible to estimate from the existing parts of the image data. For example, an area of an image covered by an artifact may be completed from the surrounding context of the artifact in the same image data. Additionally or alternatively, different image data, for example acquired by a different imaging technique, may be used, for example in conjunction with the first image data, to complete the image data in the missing area.

In an example, the type of object that the data comprises information about may be informative of missing information. For example, if data is known to at least partially comprise information about a known type of object. In an example, image data may relate to telephones mostly or only. If then, in a given piece of such image data, a part of the image data comprising a single key is missing, the missing number can be inferred from the type of data, the exact design of the key may be inferred from the rest of the image by example embodiment according to all exemplary aspects.

In some cases, incomplete first data may be completed using second data. First and second data can be of the same or different modality, such as image data on the one hand and text data on the other hand. First data may be informative of the missing information in the second data, or vice versa.

For example, the first and second data may both at least partially comprise information about the same object. In an example for two pieces of data, first image data may be informative of an MRI scan of a leg previously captured, at the same time, there is information missing in a text file about the size of a bone in order to create a bespoke knee orthosis for the same patient. The image data may in this case comprise information missing in the text data and enable the completion of information in text data.

Example embodiments according to all exemplary aspects may allow to leverage different data acquired about a single object or even about the type of object in general in order to complete missing information in a given piece of data. To this end, a model of at least the interactions of different types of data within a single modality and across modalities may be useful. For example, a model may further model the typical properties of data acquired from a certain type of object. For example, such a model can be specific to the type of object the data relates to. At the same time, the model may for example be specific to the types of data typically acquired about the type of object. For example, the type of object may be a patient and the types of data may be data of the modalities image and text. The types of text data may for example be electronic medical records and the types of image data may be different types of image data acquired by medical imaging techniques such as X-ray radiography, computerized tomography, fluoroscopy, magnetic resonance imaging, ultrasonography, endoscopy, elastography, tactile imaging, thermography, microscopy, positron emission tomography and others.

In one example embodiment of all exemplary aspects, a machine learning model may be trained using data from many different objects, in particular of objects of the same type, in particular patients, in order to gain insight from the available data of one given object, in particular one given patient.

In an example of all exemplary aspects, a machine learning model is trained with at least two pieces of data at a time. This data can be of at least two or more different modalities such as for example image data and text data. The data can in addition or in the alternative be of other modalities, as disclosed above. The pieces of input data can further be of the same modality. For a modality, multiple pieces of data can be used for training or a single piece of data may be used.

In an example embodiment of all exemplary aspects, data may be provided to a machine learning model in two or more different modalities at a time. In another embodiment of all exemplary aspects, three or more modalities can be provided to a machine learning model at a time. For a given combination of input data, the machine learning model can then be trained.

Data obtained by the machine learning model may be referred to as input data. Data outputted by the machine learning model may be referred to as output data.

A machine learning model can for example be any algorithm that receives an input and gives back an output wherein the output is dependent on both the input and on at least one parameter of the machine learning model. For example, the input can be a representation of an image and the output can be an estimated class for an object displayed on the image. The input can for example be a feature vector in which a coordinate represents a certain property of an object. A property may for example be the intensity of a pixel in a certain area of an image, it can for example in addition or in the alternative be a derived quantity such as the maximum value of an audio signal.

A machine learning model can for example be trained to learn a relation between one or more inputs and one or more outputs. A trained machine learning model can be used to generate output(s) from new input(s).

For example, the input(s) to a machine learning model can be data. The input data can for example be of any representation, such as, for example, a scalar value, a vector, a matrix, a tensor or a combination thereof or any other representation. The input data can for example be of a single modality or multiple different modalities, in particular the data can be image data, text data, data from other modalities such as audio, graphs or others. Input data can comprise a single of multiple pieces of data.

For example, the output(s) of a machine learning model can be output data. The output data can for example be of any representation, such as, for example, a scalar value, a vector, a matrix, a tensor. The output data can be of different modalities, in particular the data can be image data, text data, data from other modalities such as audio, graphs or others. Output data can comprise (e.g., contain) a single of multiple pieces of data.

For example, the input data can comprise a single scalar value which is informative of height of an animal. In this example, the machine learning model could generate a scalar output that gives back an estimated weight of the animal's brain. The machine learning model in this case may be summarized as a simple formula, for example (brain weight kg)=A*(height in m), wherein height is the input. A is a parameter to be learned and the brain weight is the output. This machine learning model learns the proportionality constant A between height and brain weight.

The machine learning approach enabled by example embodiments may be much more advanced. A respective machine learning model may for example be capable of classifying input data (that is, associating a given input to one of multiple distinct possible outputs) and/or regressing input data (that is, deriving one of multiple continuous output quantity/quantities from one or multiple continuous input quantity/quantities).

For example, a machine learning model can be and is to be trained. Training a machine learning model may comprise at least one parameter of the model being adjusted. Parameters of the model may influence the output. Adjusting a parameter can thus in some examples have the effect that the output of a model is altered while the input stays constant. For example, training can serve the purpose to cause the machine learning model to give back a desired output for a given input.

Training a machine learning model can for example be done in a stepwise fashion. The basic principle of a stepwise training comprises at least a part of the following steps. First provide input data to a model, then let it generate output data following its internal mechanism at least partially depending on a parameter of the machine learning model. After that, the output may be evaluated by, for example, comparing the output to a desired output and quantifying the difference. According to the quality of the output as quantified in the evaluation step, at least one parameter of the model may be adjusted in a way as to improve the quality of the model's output.

In some example embodiments according to all exemplary aspects, the at least one parameter of a machine learning model is adjusted in order to change the output of a machine learning model so that the output approaches a desired output.

For example, taking a very simple model relating to the relation between height and brain weight, an arbitrary value of the parameter A may first be initialized. In a first training step, a first height of a first individual is input. In the example of above, the desired output (brain weight) is known as well. The machine learning model outputs a result based on its parameter A. In the training step, the parameter A may be adjusted to reduce the deviation between the output of the model and the true value of brain weight.

For example, a machine learning model may be trained to at least recreate the input data presented to it. In a simple case, for example, the machine learning model receives input data and is trained in a way that its output data comprises information about at least parts of the input data and/or approaches the input data in as much detail as possible. For example, a machine learning model may be trained to generate, based on input data, output data that shares information with the input data and/or is at least partially indicative of the input data. For example, the input data can be image data and the model can be trained to generate output data that is at least partially informative of that input image data. The output data in this case may for example be of a first modality such as for example image data. The output data may be of the same modality as the input data. The output data may further be of another modality than the input data such as for example text data.

A machine learning model that at least partially recreates the input data can for example be called or is an autoencoder.

For example, a so-called loss function may be used for training to evaluate the machine learning model at least partially based on the output. For example, a loss function can include a metric of comparison of the output to some reference quantity. A loss function can for example be defined when a reference output for a given input is known. A reference quantity may for example be a desired output, an unwanted output, an acceptable output, or a combination thereof, to name but a few non-limiting examples. A reference quantity may in addition or in the alternative for example be a past or future output of the machine learning model itself. The loss function may be chosen in such a way that it rewards a wanted relation between output and reference quantity and/or penalizes an unwanted relation between an input and an output. Such a relation can be a similarity, a dissimilarity, with in part or as a whole or another relation.

A high absolute value of a loss function in a given training step may for example be at least partially indicative of a degree of change required for the machine learning model, for example, at least a part of its parameters, in order to improve the machine learning model's performance. The loss function output may be specific for a given purpose, such as for example, approaching a wanted output.

A loss function may for example quantify the deviation between a first output of the machine learning model for a given input and a second output, for example the desired output for the given input.

For example, in the simple model example described above, the loss function could be the difference between the true brain weight and the brain weight output by the machine learning model, or alternatively the absolute value of the difference. In this later case, a high absolute value of the loss function can mean that the parameter A needs to undergo a strong change.

In the case of a scalar output, a loss function may be a difference metric such as an absolute value of a difference, a squared difference. The loss function may always output positive values. The loss function may in addition or in the alternative (e.g., only) output negative values. The loss function may be capable of outputting negative and/or positive values.

In the case of vector-valued outputs, for example, difference metrics between vectors such as the root mean square error, a cosine distance, a norm of the difference vector such as a Euclidean distance, a Chebyshev distance, an Lp-norm of a difference vector, a weighted norm or any other type of difference metric of two vectors can be chosen. These two vectors may for example be the desired output and the actual output.

In the case of higher dimensional outputs, such as two-dimensional, three-dimensional or higher-dimensional outputs, for example an element-wise difference metric may for example be used. Alternatively or additionally, the output data may be transformed, for example to a one-dimensional vector, before computing a loss function.

For example, when training the machine learning model according to all exemplary aspects using a loss function, the desired value of the loss function may be small. In this case, the machine learning model may be adjusted in a way to reduce the value of the loss function. For example, the machine learning model can be adjusted in a training step in order to reduce the value of the loss function computed for that step. It may all the same possible to use a loss function for which high results are defined as desirable.

At least part of the output data of a machine learning model for a given input data may for example be understood as a different representation of at least part of the input data.

The machine learning model according to all exemplary aspects may for example generate more than one piece of output data. The machine learning model according to all exemplary aspects can for example output first output data by a first part of the machine learning model. The machine learning model according to all exemplary aspects may generate second output data based at least partially on the first output data.

The machine learning model according to all exemplary aspects can for example comprise a succession of parts of the machine learning model. The parts of the machine learning model can for example generate respective output data from respective input data. At least part of the output data of at least one of the parts of the machine learning model can be seen as representations of at least part of the input data.

The machine learning model according to all exemplary aspects and/or parts of the machine learning model can for example be interpreted as encoders that transform data from a first representation to a second representation.

The machine learning model according to all exemplary aspects and/or parts of the machine learning model can for example be interpreted as decoders that transform data from a first representation to a second representation.

In some embodiments of all exemplary aspects, the machine learning model may comprise at least one first part that receives first input data in a first representation and a second part that receives second input data in a second representation. The first part may generate first intermediate data. The second part may generate second intermediate data. The first intermediate data and the second intermediate data may be representations of the first input data and second input data respectively. The machine learning model may further involve a third part that is able to combine the first intermediate data and the second intermediate data into joint intermediate data. The machine learning model may further involve a fourth part that receives the joint intermediate data and generates first output data from the joint intermediate data. The model may further involve a fifth part that receives the joint intermediate data and generates second output data from the joint intermediate data.

In some example embodiments of all exemplary aspects, in a given training step, first input data and second input data may be provided to the machine learning model at a time.

In some embodiments of all exemplary aspects, by creating a joint representation and generating output data from the joint representation, the machine learning model may be forced or performs and/or controls to link the first input data and the second input data to any given output data. Information from first input data and second input data may be used to generate a given piece of output data. In particular, information from first input data in a first modality and from second input data in a second modality may be transferred to output data in a third modality. The first and the second modality may be different from another. The third modality may be different from at least one of or even both first input data and second input data.

In one embodiment of all exemplary aspects, the machine learning model is to be trained in a way that it can obtain (e.g., receive) input data comprising a flaw. The machine learning model may generate output data from that input data at least partially without the flaw. The flaw can in particular be a certain missing information in the input data or a corrupted input. The input data in this case may be image data that may comprise a missing image portion, may be distorted, twisted, blurred, or otherwise corrupted. The input data may as well be text data comprising a missing text portion or another flaw according to a procedure of corrupting text or the input data may be of another modality such as audio data which may, e.g., be corrupted, e.g., by added noise or by some other procedure.

The output data may at least partially "repair" the input data by filling in missing parts and/or removing at least some of the qualities of the input data that qualify it as corrupted or flawed.

The (e.g., training) method of a respective machine learning model, e.g., as disclosed above, comprises the step of obtaining first input data and second input data. The machine learning model may in addition obtain third input data and/or additional pieces of input data.

Obtaining data can for example mean that the machine learning model can receive the data, receiving a reference to the data, gaining access to the data, actively requesting the data, passively receiving the data, or a combination thereof, to name but a few non-limiting examples. Some or all different pieces or input data, such as for example first and second input data, can be obtained together in substantially the same step. The different pieces of input data can be obtained in separate steps. For example, input text data can be obtained in one step and input image data can be obtained in another step. In an example, obtaining may denote keeping previously obtained data.

The first input data may for example be text data. This may allow that the first input data is at least partially informative of a text and/or that it can be transformed to a representation comprising text. The first input data can represent and/or be indicative of an edited source text data.

Source text data may for example be indicative of a text. From the source text data it may be possible to generate a single and/or multiple pieces of text data. In a more concrete example, the text of which source text data is indicative may be an electronic medical record that at least partly comprises information about at least a part of one or more patients.

Edited source text data may for example be generated from the source text data by editing the source text data. The editing can for example comprise such steps as cropping the source text data. Cropping can mean that a share of the overall source text data is kept for the generation of edited source text data and other parts are left out. For example, word, sentences, paragraphs, pages, files, tables, and/or combinations thereof can be left out, to name but a few non-limiting examples.

The editing may for example additionally or alternatively to the cropping comprise the steps of corrupting the source text data and/or the cropped source text data. Corrupting can for example mean that the source text data and/or cropped source text data undergoes a step of masking, rearranging text parts, deleting text parts and/or replacing text parts with new text, wherein text parts can be one or more of letters, numbers, words, sentences, paragraphs or pages. Many other ways to corrupt text are imaginable and this list is not exhaustive.

The steps of cropping and corrupting may be carried out one after another, e.g. in an arbitrary order, or may be combined into essentially one step. It may be possible to for example corrupt the entire source text data and then crop it or first crop a piece of the source text data and then corrupt it. Multiple steps of both corrupting and/or cropping can be carried out jointly or in succession.

The second input data may for example be image data. This can mean that the second input data is at least partially informative of an image and/or that it can be transformed to a representation of an image. The second input data may represent and/or be indicative of an edited source image data.

Source image data can for example be indicative of an image or of multiple images. From the source image data it may be possible to generate a single and/or multiple pieces of image data. In a more concrete example, the source image data may be informative of an image captured by a medical imaging technique such as MRI, CT, fluorescent microscopy, and/or another imaging technique. Such an image may be acquired from a patient and can thus at least partially comprise information about at least a part of one or more patients.

Edited source image data can for example be data generated by editing source image data. The editing can for example comprise such steps as cropping the source image data. Cropping can mean that a share of the overall source image data is kept for the generation of edited source image data and other parts are left out. Cropping can in particular mean to choose a sub-area of the image data and (e.g., only) keep the image data comprised in that sub-area. The sub-area can for example be a rectangle of a certain orientation, aspect ratio and size.

The editing can for example additionally or alternatively to the cropping comprise the steps of corrupting the source image data and/or the cropped source image data. Corrupting can for example mean that the source image data and/or cropped source image data undergoes a step of masking, rearranging, distorting, rotating, mirroring, coloring, changing contrast, changing brightness, pixelating, smoothing, and/or adding noise. Many other ways to corrupt image are imaginable and this list is not exhaustive.

For any modality, the term "unedited" source data, as used herein, may be understood that one or multiple steps of editing may be omitted compared to the "edited" source data. It does not necessarily mean that unedited source data is the source data which is in its original form without any modifications. If compared to "edited" source data, the "unedited" source data is at least missing one step of editing. For example, the "unedited" source data may be cropped, but not corrupted in addition to the cropping, and/or the "unedited" source data may have one step less of corrupting than the "edited" source data.

The editing may for example (e.g., only) be carried out on a part of the source data and/or the input data. For example, the input data may (e.g., only) be corrupted in a part of it. Editing may also (e.g., only) be carried out partly. For example, an editing step may be left out. An editing may be carried out partly on parts of a data and/or the full data considered.

Data may be partly unedited. Partly unedited data may for example (e.g., only) in parts of it lack a step of editing compared to the edited data. For example, partly unedited image data may in one area of the image data be cropped and corrupted by both adding noise and an increased contrast ratio, in the rest of the image data, the step of adding noise can have been omitted. In this case, the image data may be seen as partly unedited in the area without noise and edited in the area with noise.

Generating an edited version of source data can be advantageous for different reasons. Firstly, if the edited input data is generated in a two-step process comprising cropping and corrupting, there exist at least two versions of the cropped input data: corrupted and not corrupted, in this example. This may allow for training the machine learning model as the performance of the machine learning model to be assessed under different perspectives, e.g., with respect to the corrupted input data, the non-corrupted input data, the source data, or a combination thereof, to name but a few non-limiting examples.

In actively editing the source data, the training of the machine learning model can be actively shaped in a way that suits, e.g., the machine learning model, the training method, the desired function of the trained machine learning model, and/or a combination thereof. As an example, if image data that will be presented to a machine learning model is expected to be indicative of a plurality (e.g. at least two) images taken at very different levels of exposure, a machine learning model may be trained to behave well for all exposure levels by training it with edited images in which the exposure has been artificially modulated in the corruption step. If for example, a machine learning model is to be trained to recognize objects even if only small shares of the overall image are available, strongly cropped training input image data may be used.

Generating edited input data from source data may further allow that a plurality of training samples may be present. Oftentimes, data availability is an issue for training machine learning models and generating such edited versions helps "augmenting" the data basis which is available. As a result, more training steps with different pieces and/or versions of the same source data can be carried out and the performance of the trained model can be improved by training it in much more training steps compared to the number of iterations possible just using the unedited source data.

One central decision to make when training a machine learning model is the desired behavior of the machine learning model. Depending on such a choice, the model will learn to fulfill a certain function. For example, for any given input data, a certain output data may be desired. This desired output may be called test output.

Test output data can be defined and/or is data informative of the test output. Usually, the test output data will form a part of the loss function as alluded to above, where the test output data may form a reference to which the output data of the machine learning model is to be compared in a given training step.

In a first example, for a respective machine learning model as utilized by example embodiments of all exemplary aspects having obtaining at least first input data in a first modality and outputting first output data in the same, first modality, the test output data may simply be the first input data. For example, if the output data is of the modality image, this output data may be compared to the input image data as test data. Or, in another example, if a certain piece of output data is of the modality text, the output data may be compared to input text data as test data. In these cases, the respective machine model is trained as or is an autoencoder.

In another example embodiment of all exemplary aspects, it may be advantageous to consider as a reference (test data) not the actually obtained input data, but a "better version" of the input data. As disclosed above, the input data may be derived from a source data that has been edited. The editing can comprise steps such as cropping and corrupting. In the loss function, the output data may then be compared not to the edited source data as test data, but to unedited source data. Unedited source data here means that at least one editing step, such as for example cropping and/or corrupting, has been omitted compared to the edited source data.

In one example, the output data may be compared to the non-corrupted or less corrupted version of the source data. In doing so, even a perfect recreation of the input data may not lead to a perfect loss function output. When the machine learning model succeeds in recreating the non-corrupted version, a perfect loss function output is achieved.

In an example embodiment according to all exemplary aspects, the input data may be image data that is both cropped and corrupted and the desired output data would for example be cropped, but not corrupted or less corrupted.

In an example embodiment according to all exemplary aspects, a respective joint representation of the at least two different input data is generated. The joint representation may be informative of both first and second input data, for example. At least one parameter of the machine learning model may influence the generation of a joint representation. It is possible that more than one parameters of the machine learning model influence the generation of the joint representation. The input data can in this case comprise two or more different pieces input data. The input data may be of different modalities such as image data, text data, audio data, data of graphs, data of diagrams, or a combination thereof, to name but a few non-limiting examples.

In an example embodiment according to all exemplary aspects, the generation of a joint representation first involves a step of generating one or multiple intermediate representations per input data. In an example, a series of intermediate representations is generated, wherein the first intermediate representation is generated from the input data, the second intermediate representation is generated from the first intermediate representation and so on.

In an example embodiment according to all exemplary aspects, input text data may be, as a first step of the machine learning model or in a separate data preparation step, be transformed from a first representation such as, e.g., a continuous text, to a tokenized representation such as for example a vector of numbers.

The input text data may then be transformed from a first representation, for example a vector or a matrix, to a second representation. The second representation may for example be a vector as well or a matrix. The transformation may comprise, for example, a convolution with a filter kernel. The transformation may comprise convolutions with multiple mutually different filter kernels. A filter kernel can be a one-dimensional vector in the case that the representation of text data is a vector. It may alternatively or additionally be a matrix in the case that the representation of text data is a matrix.

In an example embodiment according to all exemplary aspects, input image data may be represented as a matrix. In the matrix, a respective entry may represent the intensity value of one image pixel in a certain color channel and/or an intensity value without any association to a color. The position of the pixel in the matrix may be indicative of the position of the pixel in the image data. In the presence of multiple color channels, multiple matrices may form the input image data and/or the matrices for a respective color channel may be concatenated to a single matrix.

The input image data can for example be transformed to another representation, e.g., by a filter. A respective filter may for example be a convolutional filter that is applied to a part or the entire image data. The filter may comprise convolutions with multiple mutually different filter kernels. A convolutional filter may comprise a filter kernel that may be a matrix with dimensions comparably small to the dimensions of the image data. For example, the filter kernel may be a 3×3 matrix while the input image data has a size of 200 pixels×200 pixels. The filter kernel may for example be a Gabor filter, an edge detector, a relief filter, a smoothing filter, a sharpening filter, or a combination thereof, to name but a few non-limiting examples. The generated representation may be another matrix per filter kernel that is obtained by convolution of the input image data with the filter kernel. In case of multiple filter kernels, multiple matrices are obtained.

The resulting matrices generated by applying a filter are sometimes called feature matrices as they represent the result of a convolution with a certain filter kernel that may be indicative of the presence of a certain feature in the data matrix at a given position in the feature matrix. For example, if the filter kernel is an edge detector, the resulting high entry in the feature matrix may indicate the presence of the feature of an edge at that position in the image data.

It may for example be possible to combine a convolution filter with a so-called pooling operation, wherein neighboring entries in the feature matrix representation are combined in order to reduce the number of entries and remove redundant data. At the same time, the resolution of the representation of the input image data may decrease through pooling. If another convolution is applied after the first convolution and the pooling, the number of filters may be increased to capture more different features of the data. The size of the filter kernel may for example stay unchanged before and after the pooling operation. Thereby, the filter kernel spans a larger relative size compared to the overall size of the feature matrix representation.

Typical parameters of the machine learning model that influence the generation of a representation of input data can be the entries in filter kernels.

In any convolution between a filter kernel and a vector, matrix, tensor, or the like, the edges of the data may be padded with, for example, zeros, the average of neighboring pixels, the mirrored pixels of the image data next to the edge, or a combination thereof, to name but a few non-limiting examples. Alternatively, the convolution kernel may not be applied to the outer edges of the data so that the filtered version is slightly smaller than the non-filtered data.

Other generated representations of input image data are possible such as feature vectors in which vector entries representing image properties such as for example brightness, average color, number of disjoint areas with an intensity above a threshold, or a combination thereof, to name but a few non-limiting examples. Another possible representation of an input image data can be for example a transformed version in frequency-space, such as a Fourier transformed representation, a cosine-transformed version, or a combination thereof, to name but a few non-limiting examples.

The representations of data may become (e.g., very) abstract and/or high-dimensional. For example, if multiple steps of encoding an image as feature matrices are repeated, the dimension of the resulting feature matrix may decrease strongly in dimensions through pooling and the number of features may increase. In an extreme example, a 10×10 image may be represented as 100 matrices of size 1×1 which are combined (e.g., arranged in a sequence) in one feature vector. All the spatial information of the original 10×10 image is now stored in the feature vector entries combined with the filter kernels.

The feature vector of input data may be useful to compare different pieces of data. Sometimes, a coordinate of the feature vector is interpreted as a coordinate in a space. In the example of a feature vector of length 100, a 100-dimensional space results in which a respective dimension represents a feature of the original data. This space is sometimes referred to as "latent space" or a "feature embedding".

The generation of a joint representation of multiple pieces of input data, e.g., of input image data on the one hand and input text data on the other hand, may for example be achieved by taking a representation of a piece of input data and combining the representations, for example by using a mathematical operation. The respective pieces of input data, e.g., image data and text data, may for example have undergone multiple transformations and different intermediate representations before they are combined to or into a joint representation. The choice of operation for the combination of two or more representations depends at least partially on their representations, be it their respective initial representations as input data or their respective transformed intermediate representation. As an example, in the case that the different pieces of data to be combined, e.g. image data and text data, are (e.g., all) represented as matrices, tensors or other arrays with two or more dimensions they may be concatenated (directly, if the dimensions allow, or after rearranging the matrix in order to achieve fitting dimensions), multiplied either in total or element-wise, added, interlaced, entries from a matrix representations may be partially or entirely taken over into the joint representation, or a combination thereof, to name but a few non-limiting examples. In case of two or more vector representations, similar combination operations may be used such as concatenation, multiplication, addition, cross products, or a combination thereof, to name but a few non-limiting examples.

It may often be desirable that the combination operation between two representations fulfills certain criteria. The combination may for example preserve the property of differentiability. This is to mean that the input-output relation between any single value of a representation of an individual input data before combining (e.g., an entry of a scalar, vector, matrix, tensor or the like) and any single value of the joint representation allows the computation of a derivative. For example, a derivative of the entry in the joint representation may be computed with respect to the entries in the "separate" representations before combining to a joint representation. This property may for example be valuable in training where a derivative of the loss function with respect to one or multiple or even all parameters of the model is used. Differentiability of the combination functionality may be beneficial e.g. when the training of the machine learning model involves backpropagation. As an example, if two matrices representing input data $\{x^1_{ij}\}$ and $\{x^2_{ij}\}$ are concatenated to a matrix $\{y_{ij}\}$ forming the joint representation, a respective entry of the joint representation $y_{ij}$ matrix can either be an entry $x^1_{ij}$ of the first input data or $x^2_{ij}$ of the second input matrix. The combination function per joint matrix entry is thus $y_{ij} = a_{ij} * x^1_{ij} + (1-a_{ij}) * x^2_{ij}$ with $a \in \{0, 1\}$. Thus, a concatenation preserves differentiability as the function $y_{ij} = x^1_{ij}$ is differentiable with respect to $x^1_{ij}$, for example. A matrix multiplication that per element involves an element-wise multiplication of a line of a first matrix and a column of a second matrix followed by a sum also preserves differentiability. Many different other ways of combining two vectors or matrices exist that may preserve the quality of differentiability.

It may further be desirable to for example substantially preserve the information of both representations of the different input data before and after combination. The combination can however in addition or in the alternative be accompanied by a loss of information.

Based on at least two input data which may be of at least two different modalities or the same modality, a joint representation can be generated, e.g., that comprises information about at least a part of every input data.

The method according to all exemplary aspects of the subject matter may, for example, further comprises a process of generating one piece or multiple pieces of output data at least partly based on the joint representation. This step and the processes involved is sometimes called expanding.

The expanding can additionally depend on at least one or multiple parameters of the machine learning model.

The method according to all exemplary aspects of the subject matter may be seen as an encoding of input data to a joint representation and decoding of output data from the joint representation.

The part or the parts of the machine learning model that generate a representation of the input data which is then used in the generation of the joint representation, as used herein, are referred to as encoding branches. Multiple encoding branches, for example one per input data, may be provided. An encoding branch may at least partially comprise the part of the machine learning model that generates the joint representation.

The encoding branch may generate a representation of the input data that may be referred to as "encoded representation".

The encoded representations of multiple input branches may be combined to a joint representation.

The encoded representation may for example assume or have the form of a vector, a matrix, a tensor or the like. A combination of encoded representations can comprise one or more of concatenating encoded representations, multiplying encoded representations, adding encoded representations, convoluting encoded representations.

The part or the parts of the machine learning model that generate output data at least partially based on the joint representation may be referred to as decoding branches. Multiple decoding branches, for example one per output data, may be provided. The process of generating an output from the joint representation may be referred to as "expanding" and/or "decoding".

The output data may for example be of the same modality as one of the input data. For example, if a first input data is of the modality text, a second input data is of the modality image, the output data may be either text or image. The output data may be of a modality not present in any of the input data. The number of pieces of output data generated or expanded from the joint representation may be the same as the number of input data. It may be possible to generate less pieces of output data from the joint representation than the machine learning model obtains input data or more.

The concrete realization of the expanding of one piece of output data from the joint representation may depend on the desired output data modality. For example, if the output data is supposed to be of modality image, the expanding may comprise one or multiple steps of so called "un-pooling". Such un-pooling may comprise assigning the value of a single entry in one first matrix which at least partially depends on the joint representation (or another representation, potentially another representation derived from a joint representation) to multiple entries in a second matrix. The second matrix may be the output data. The second matrix may be larger by for example a factor of two in both directions than the first matrix. A single entry of the first matrix may e.g. in this case be present in the second matrix four times. An alternative to un-pooling may for example be a so called "transposed convolution", in which a second matrix is generated from a first by multiplying a filter kernel with a single value stored in the first matrix for multiple neighboring entries in the second matrix. Multiple stages of expanding the joint representation to an output, of which a respective stage may for example comprise a step of un-pooling, transposed convolution or a similar step, may be arranged one after the other.

In case of text data, similar operations to the expansion from a joint representation as disclosed above may be carried out to generate an output. In case the text has been transformed to a vector or matrix representation, e.g., in its encoding branch, the expanding process may be achieved in an analogous manner. At the end of a series of expansion steps, e.g., by an un-pooling and/or transposed convolution or the like, there may for example be an additional step like an inverse tokenization procedure that generates a text output from a vector or matrix or a similar representation of text data.

The generation of output data from a joint representation may for example depend on at least one parameter of the machine learning model. A typical parameter can be a value in one entry of a filtering kernel for one transposed convolution step. Many other parameters are imaginable.

As alluded to above, the performance of a machine learning model can be assessed using a loss function. Such a loss function typically quantifies the relation between output data of a machine learning model and reference data. The reference data can for example be the test data obtained (e.g., earlier) in the method. Typically, the loss function quantifies the degree to which the output data deviates from reference data.

It is for example possible to define a loss function as a metric that evaluates the deviation between a given output data and the test data chosen before.

According to all exemplary aspects of the subject matter, the machine learning model may generate multiple output data from a joint representation of multiple pieces of input data. The different output data may correspond to different modalities.

In one example embodiment of all exemplary aspects, multiple loss functions may be computed, one for a respective output data. The loss functions for a respective output data may be adapted to the respective output data.

In one example embodiment of all exemplary aspects, the loss function can be a metric that quantifies a deviation between a given output data and a test data in a training step. The test data may be specific to that particular output. The test data may be specific to that training step. The test data may for example be unedited source data, in particular unedited source data obtained from the same source data as at least one piece of input data (as edited source data) obtained by the machine learning model.

Such a loss function may for example comprise a sum of absolute values of element-wise differences, a maximum element-wise difference. A loss function may comprise or include a transformation of output data and/or test data to a representation that enables the computation of a certain metric. For instance, the data may be transformed to a vector, a matrix, a tensor or another suitable representation and the computation of the loss function output may comprise, for example, the computation of a correlation, an RMSE, a cosine distance and/or other metrics of deviations between two data objects.

After the output data, be it a single piece and/or multiple pieces of output data, have been generated by the machine learning model based on single or multiple given pieces of input data, the machine learning model can be evaluated using a loss function.

A loss function can for example output a scalar value at least partially based on the output data and optionally reference data. The output may quantify a property of the relation between output data and reference data.

For a respective loss function, a desired output may be defined. A desired value may for example be zero, negative or positive infinity, any given fixed value, or for example a variable value that may be adjusted during training. For example, if a loss function is a metric that quantifies the deviation between reference data, such as for example test data, and output data, a small output of a loss function may be desirable. For example, the desired output may be zero. If on the other hand, the loss function quantifies a similarity between output data and reference data, a high output of the loss function may be desirable. The desired output may for example be infinity, a maximally achievable output depending on the loss function or another value.

For a loss function output, a deviation between it and a desired output value may be determined (e.g., computed) in order to evaluate the machine learning model's performance. The deviation may for example be a simple difference between the loss function output and the desired loss function output. The deviation may for example comprise a transformation of the difference such as a quadratic transform, an affine transformation, or a combination thereof, to name but a few non-limiting examples.

In an example embodiment of all exemplary aspects, the desired output may be zero and the deviation between the loss function output and the desired loss function output can simply be the loss function output itself.

In another example embodiment of all exemplary aspects, the desired output may be high, for example the desired output may be infinite. This can for example be the case for a loss function that quantifies similarity. As a difference between a finite value and infinite may not be meaningfully determinable (e.g., computable), a deviation between loss function output and the desired output can for example be defined as the negative output of the loss function, that is, a multiplication by −1 may be carried out. Alternatively, the output of the loss function may be inverted, that is, the deviation may for example be computed as 1/(loss function output).

The deviation between loss function output and desired loss function may be referred to as loss function deviation.

In a training step, the respective machine learning model may be adjusted. Adjusting can for example comprise the change of at least one parameter of the machine learning model.

The machine learning model may be adjusted if necessary. The decision whether adjustment of a machine learning model is necessary may for example be made at least partially based on the output of the loss function. As disclosed above, a desired value may be known for a loss function and a loss function deviation between the output of the loss function and the desired value may be computed to evaluate the machine learning model's performance. This loss function deviation may in some cases substantially equate to the loss function output itself.

For example, an adjusting of the machine learning model may be deemed necessary if the loss function deviation crosses a certain threshold. The threshold may be defined manually by an operator of the training process. It may also be set automatically.

For example, training may be stopped if no adjusting of the machine learning model is deemed necessary.

Adjusting the machine learning model may comprise the change of at least one parameter of the machine learning model. As detailed before, parameters can alter the output data outputted by a machine learning model for a given input. In the consequence, the altered output may for example lead to an altered loss function output and/or an altered loss function deviation.

In an example, the magnitude of change of the parameter may at least partially depend on the magnitude of the loss function output and/or deviation. For example, a large loss function output and/or deviation may lead to a large change in a parameter. A respective parameter can be an entry in a filter kernel. A filter kernel can for example be used in a part of the encoding branch of the machine learning model from input data towards the joint representation and/or in the decoding branch from joint representation towards output data. A parameter can also be a parameter of the combining operation that generates the joint representation.

In an example embodiment of all exemplary aspects of, the magnitude of change of a parameter is derived based on a derivative of the loss function output with respect to a parameter of interest. For example, a so-called backpropagation may be used to adjust parameters. By using backpropagation, the effect of a parameter change on the output is first quantified in a computation of a derivative, and the parameter may be changed in dependence of that derivative. For example, the derivative may be the derivative of the loss function output and/or the loss function deviation with respect to a parameter change. Such backpropagation may be a propagation of an error at the output of the machine learning model to a respective parameter to be changed, e.g., in order to reduce the error. Such backpropagation can in particular be applied to parts of the machine learning model comprising an artificial neural network.

In an example embodiment of all exemplary aspects, the adjustment of a parameter in the encoding branch between input data of a first modality and the joint representation may depend on the loss function output and/or the loss function deviation computed from an output in the same, first modality, and/or on the loss function output and/or deviation computed from an output of another, second modality and/or more.

In an example embodiment of all exemplary aspects, the loss function output and/or deviation of one output may be used to adjust one parameter and/or multiple parameters.

The loss function output and/or deviation of one output may for example be used to adjust parameters in the respective decoding branch leading to the output data on which the loss function is computed.

The loss function output and/or deviation of one output may for example be used to adjust parameters in the part of the machine learning model that generates the joint representation.

The loss function output and/or deviation of one output may for example be used to adjust parameters in an encoding branch and/or parameters in multiple encoding branches. The encoding branch may be associated with input data of the same modality as the output data on which the loss function output and/or deviation is computed. The encoding branch may for example additionally or alternatively be associated with input data of a different modality compared to the output data on which the loss function output and/or deviation is computed.

In an example embodiment of all exemplary aspects, parameters in both an encoding branch of a first modality and in an encoding branch of a second modality can both be changed at least partially depending on the loss function output and/or deviation computed on the output data of the first modality and the output data of the second modality.

In an example embodiment of all exemplary aspects, the machine learning model may be adjusted in a way to reduce the loss function deviation. This may in some cases, depending on the type of loss function and the desired loss function output, correspond to a reduction in the loss function output itself. It may in addition or in the alternative correspond to an increase in the loss function output.

In an example embodiment of all exemplary aspects, a respective machine learning model may for example be trained across multiple iterations.

An iteration may comprise at least one of the steps of obtaining the input data, obtaining test data, generating a joint representation, generating output data, evaluating the output data at least partially based on the test data and a loss function and adjusting the machine learning model by changing at least one parameter of the machine learning model.

In an example embodiment of all exemplary aspects, the input and/or test data may change between iterations. For example, the type of editing may change in that for example a different part of the source data is cropped and/or a different corrupting measure is taken. It may in some embodiment of all exemplary aspects be of advantage to at least in some iterations change the type of corruption with respect to the last iteration, but not the type of cropping in order to be able to use the same test data in two successive iterations.

Across iterations, additionally or alternatively to the type of editing, the source data from which at least part of the input data is derived may change as well between iterations. For example, source image data may stem from a first object, such as a patient, in a first iteration and from a second object, such as a second patient, in another iteration. Further, training a respective machine learning model may comprise many iterations across a variety of source data and a variety of editing steps.

The machine learning model may be adjusted in (e.g., each) iteration or after multiple (e.g., at least two) iterations.

For example, across multiple iterations, the input data may be partly altered between iterations, but some aspects of the input data may stay unchanged. For example, the object or type of object from which at least part of the input data was obtained may be the same for some, most or substantially all iterations. For example, the object may be a certain body region to which source data relates. In another example, the input data of substantially all iterations can have been obtained from different human patients.

By training the model on many different edited variants of input data and rewarding a partial correction of the editing (e.g., by computing a loss function as a deviation of the output from an unedited version of the input data), the model may attain the ability to treat incomplete and corrupted data and even automatically complete data. The latter may be referred to as "autocompletion".

By training the model on different input data obtained from many different objects that share certain aspects, that is, from object of the same type, such as for example human patients, the model may attain the ability to learn typical features of the objects of that type. The model may further be able to treat diverse input data from that type of data. The model may in particular develop the ability to generate expected properties of a given object based on the input data available without the input data necessary comprising information about these properties.

The machine learning model may be trained for a fixed number of iterations. The training may be stopped after the fixed number of iterations has been reached. For example, for each available source data, a fixed number of iterations may be executed. In the different iterations on the same source data, the source data may be adjusted.

Alternatively or additionally, the training of the machine learning model may be stopped when a criterion is met. For example, a criterion for the output of a loss function of the machine learning model may be defined. For example the training of the machine learning model may be stopped if a loss function that quantifies the deviation between output data and test data is lower than a given threshold. A criterion can additionally be that the output of a loss function needs to fulfil a criterion in multiple iterations, for example with different input data.

In another example embodiment of all exemplary aspects, the machine learning model may for example comprise an artificial neural network.

In an example, at least parts of the machine learning model can comprise artificial neurons that receive inputs from other artificial neurons through connections of a given weight. An artificial neuron can integrate the inputs to an output by, for example, summing the inputs and applying a function such as for example a sigmoid transform to the sum in order to obtain an output. The output of an artificial neuron multiplied by a connection weight can form the input to another artificial neuron.

A series of convolutions alluded to above is sometimes referred to as a convolutional neural network. The machine learning model may for example comprise a convolutional neural network.

In an example embodiment of all exemplary aspects of, the architecture of at least one encoding branch from input image data to joint representation and at least one decoding branch from joint representation to output image data can be similar to a U-Net architecture (see e.g. O. Ronneberger et al.: *U-net: Convolutional networks for biomedical image segmentation*, in: International Conference on Medical image computing and computer-assisted intervention, pp. 234-241, Springer, 2015, https://doi.org/10.1007/978-3-319-24574-4_28).

The input text data can for example comprise information about a patient. The input text data can for example at least partially comprise information about an electronic medical record (EMR) of a patient. It can additionally or alternatively comprise information about vital parameters, physiological measurements, prescribed, recommended and/or other medications or other information that may relate to the patient's health.

The input image data can for example comprise information about a patient. The input image data can for example comprise information about at least one image of at least one body region of a patient. Such an image may have been acquired by, for example, photography, X-ray radiography, computerized tomography, fluoroscopy, magnetic resonance imaging, functional magnetic resonance imaging, ultrasonography, endoscopy, elastography, tactile imaging, thermography, microscopy, positron emission tomography or other imaging techniques.

The input text data and the input image data can for example comprise (e.g., contain) information about the same patient. The input test data and the input image data can for example comprise (e.g., contain) information about different patients.

The input text data and/or the input image data may for example comprise information about patients that share at least one similarity such as the gender, the age, a certain disease, a test result, a pregnancy, or any other similarity.

The machine learning model may be adjusted so as to achieve a certain output. The output may for example be evaluated using a loss function as described above. In some examples, the loss function and choice of reference data is designed in a way as to reward a "reconstruction" of the input by the machine learning model. The machine learning model is trained in a way to make the output resemble the input. This may for example be referred to as reconstruction learning.

Additionally or alternatively, the machine learning model may be adjusted at least partially based on one and/or multiple representations, e.g. which are at least partially based on the input data.

The machine learning model may for example generate multiple representations of the input data which may be generated in an encoding branch, a decoding branch, and/or in the part of the machine learning model generating the joint representation. A representation can for example be one or multiple vectors, matrices, tensors and/or a combination thereof. For example, a representation may be a feature matrix generated from input image data, a feature vector generated from input text data, or a combination thereof, to name but a few non-limiting examples.

Representations may be compared among each other. In particular, a representation at the same stage of the machine learning model, for example the joint representation or any other representation, can be compared across multiple iterations of the training of the machine learning model. For example, two or more representations can be compared which are generated at least partially based on two or more different input data.

Comparing representations may for example comprise or involve computing a metric that evaluates the deviation between representations. Such a metric may be referred to as representation deviation metric. For example, if a metric is a vector, a matrix, a tensor or a combination thereof, the representation deviation metric may comprise an element-wise difference of two representations. For example, the representation deviation metric might involve the computation of a sum of squares of element-wise differences, a maximum absolute difference across all elements, or other similar metrics that allow a quantification of how similar two representations are. For example, in the case of a vector-valued representation or after a transformation of a representation into a vector-valued form, two representations may for example be compared using an RMSE, a cosine-distance, a correlation measure, or a combination thereof, to name but a few non-limiting examples.

A representation deviation metric may output a scalar value that quantifies similarity or dissimilarity of two data objects.

Respective representations may undergo one or multiple transformations before being compared using a representation deviation metric. For example, a respective representation may be filtered using one or multiple convolutional filter kernels. For example, additionally or alternatively, a respective representation may be pooled as described for the encoding branch, that is, multiple entries in a representation may be merged to a single entry. In particular, entries may for example be pooled using attention-weighted pooling, wherein different weights are applied to the pooled outputs. Weights may for example be chosen at least partially dependent on how variable the affected pooled entries of the representation are. For example, additionally or alternatively, a respective representation may be transformed to a vector, e.g., by simply rearranging the entries to a one-dimensional array.

In an example embodiment of all exemplary aspects, for two representations at the same stage of the model (e.g., the joint representation or another representation) at least partially based on two different input data may be similar or dissimilar depending on the two input data they are based on. In this way, a better separation between different objects in their representation may be achieved. For example, the training of a respective machine learning model based on the output of the loss function computed on the output data generated alone may not directly control the properties of the intermediate representation. This may in some cases result in undesirable properties in the representation.

The comparison of representations for at least two different input data described above using a representation deviation metric can be used to adjust the model, similarly to the loss function at the output.

The two different input data, first input data and second input data, may belong to the overall body of input data obtained by the machine learning model in the course of training. As the machine learning model is trained in multiple iterations, multiple individual input data will be presented to the machine learning model. First and second input data may be input data presented to the machine learning model in two different iterations. For example, the two input data may comprise text data and image data respectively. The first and second text data may stem from the same source text data or they may stem from different source text data. The first and second image data may stem from the same source image data or from different source image data.

The representation deviation metric may for example differ depending on whether the input data stems from the same object or not. For example, if two pieces of input data are differently edited versions of the same source data, the representation deviation metric may be chosen in a way to reward similar/penalize dissimilar representations of these two pieces of input data. For example, if two pieces of input data stem from different source data, the representation deviation metric may be chosen in a way to reward dissimilar/penalize similar representations.

As an example, the representation deviation metric may involve the computation of a sum of absolute values of the element-wise differences. Depending on the source data (same or different for two given pieces of input data), a high or a low value may be desired. The metric itself may incorporate knowledge about whether representations are supposed to be similar or dissimilar. For example, the representation deviation metric may flip its sign in one of the two cases and leave it unchanged in the other case.

The respective machine learning model may then be adjusted depending at least partially on the output of the representation deviation metric. For the representation deviation metric, a desired output may be defined and the machine learning model may be adjusted so that the representation deviation metric approaches the desired output. For example, if the representation deviation metric is chosen in a way that low output values are desirable, the machine learning model may be adjusted to for the representation deviation metric to decrease.

In an example embodiment of all exemplary aspects, the machine learning model may be used to generate a first representation based at least partially on first input data based on first source data. The respective machine learning may further generate a second representation based on second source data. The two representations may be compared using a representation deviation metric and the knowledge about whether the two source data are identical or not.

The representation deviation metric may incorporate the knowledge whether the two source data are identical or not. Alternatively, the output of the representation deviation metric may be evaluated differently depending on whether the two source data are identical or not. For example, the desired output of the representation deviation metric may be chosen depending on whether the two source data are identical or not.

The training of a respective machine learning model that is trained in a way to generated similar representations for the input data from the same source data and dissimilar representations for input data of different source data may be referred to "contrastive learning". Such contrastive learning may allow that no curated dataset with complete labels of data is required for training. The machine learning model can instead be trained on data without labels in an unsupervised and/or self-supervised manner.

In this way, a representation of the data, potentially a joint representation of multiple pieces of data, is learned that is task-agnostic and can be used for a variety of tasks.

The training steps of reconstruction learning and contrastive learning can for example be executed separately in two different steps. For example, the adjustment of the machine learning model, that is, the change of one or more parameters of the machine learning model can in a first step be adjusted to improve the output of the loss function and in a second step one or more parameters can be adjusted to improve the output of the representation deviation metric. Whether "improve" means decrease or increase depends on the loss function, representation deviation metric, source data and/or other factors.

The training steps of reconstruction learning and contrastive learning can in another example be combined. For this purpose, a combined overall loss function may be computed that integrates both the output loss function and the representation deviation metric. The machine learning model may then be adjusted using the overall loss function in one step.

The method according to all exemplary aspects of the subject matter may be implemented at least partially in an apparatus. The apparatus may for example comprise at least one processor and at least one memory including computer program code. The memory and/or the computer program code may be configured to cause the apparatus, with the at least one processor, to expand incomplete input data and/or to identify uncertain parts of input data.

The apparatus can for example achieve this by receiving at least one of input text data and/or input image data, generating output text data and/or output image data, wherein the output image data is at least partially dependent on the input text data and/or the output text data is at least partially dependent on the input image data.

For example, an apparatus may use a machine learning model trained according to any one of the examples above wherein for example the joint representation may serve the purpose of linking at least first input data and second input data and for example using information of both in the generation of one or more output data.

A respective trained machine learning model trained according any one of the preceding examples or an apparatus implementing a machine learning model may be used by (e.g., firstly) providing input data to it.

The provided input data may for example comprise text data and/or input image data, wherein the input text data may for example comprise (e.g., contain) information about a patient, an electronic medical record of a patient or multiple patients, information about vital parameters, physiological measurements, prescribed, recommended and/or other medications or other information.

The provided input data may further comprise image data which comprises information about a patient, for example one or more of a magnetic resonance scan, a functional magnetic resonance scan, a computer tomography scan, an X-ray scan, a photography, and/or a fluorescent microscope image of at least one body part of a patient.

The apparatus and/or the trained machine learning model can then be used to generate output text data and/or output image data.

As the machine learning model may for example have been trained with corrupt and/or cropped data and may further for example have been trained jointly on data of different modalities and on a variety of source data, the generated output data of a first modality may comprise (e.g., contain) information not present in the input data of that modality. The model may thus be used to (e.g., auto-) complete e.g. missing pieces of data. This ability may for example be routed in the merging of different modalities of input data in the joint representation. By merging the modalities, an information transmission from input data of one modality to output data of another modality may be enabled. The ability to transfer information between modalities may additionally be routed in the training across many different objects of the same type, such as patients.

The respective trained machine learning model and/or the apparatus implementing the machine learning model may further be used to detect uncertain parts of the output data. It may in addition or in the alternative be used to detect questionable parts of the input data. This may for example be achieved by repeating the steps of providing input data, such as input text data and/or input image data, and generating output data, such as output text data and/or output image data at least once. Between repetitions, for example, the at least one part of the input data can be different between repetitions. For example, the order of words in text data may be altered or a synonym may be used to replace a word, in images a region of the image may be slightly or severely altered by, e.g., masking it or adding noise to it. Any of the procedures named above for corrupting data may be applied to alter the data. The input data can be randomly altered between repetitions and/or altered in a deterministic fashion. Providing slightly amended input data to the machine learning model may be referred to as test time sampling.

The output data obtained in different repetitions can be compared and parts that change comparably much compared to the overall change of the output data may be classified as uncertain. For example, in output image data, in a pixel or in a subarea of the image data consisting of multiple pixels, the variability across the repetitions can be assessed using a metric such as the variance in pixel values and/or average pixel values in an image area across repetitions. If areas and/or certain pixels have a particularly high variance, these can be identified as uncertain.

Uncertainty in parts of data may for example mean that the information comprised by this part of the data is not reliable and may be misleading. Such an identification of uncertainty can for example be particularly useful, if missing parts of the data were completed by the machine learning model and the user wants to be sure if they can rely on the added pieces of data.

Additionally or alternatively, a range of values for a given aspect of the output data, for example for a parameter captured in text data or for an intensity of an image region, can be estimated using the repeated generation of output data using the machine learning model with at least slightly changed inputs. In this way, a range of expected values for a missing part of the input data may be obtained and may inform the user.

Additionally or alternatively, the output data can be compared to the input data and in case of inconsistencies between the output data and the input data, these may be communicated to a user. For example, if a range of probable values for a given parameter comprised in the output text data is obtained using the model and the parameter stored in the input data does not fall into the probable range of values for that parameter, the user may be notified. Alternatively or additionally, a corrected part of the input data may be proposed or automatically inserted. This function may be referred to as "autocorrection".

The features and example embodiments described above may equally pertain to the different aspects.

It is to be understood that the presentation in this section is merely by way of examples and non-limiting.

Other features will become apparent from the following description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

FIG. 1 shows a machine learning model 100. The model may be trained using data. Data may be provided as input data 112, 122 in at least two different modalities M1 and M2. The input data may for example be of the modalities text and image but may in addition or in the alternative be of different modalities. More than two inputs are possible which may be of more than two different modalities or two modalities. An input data 112, 122 may be stored in a machine-readable format such as an array of numerical entries, for example a dynamically allocated array of one, two, three, four or more dimensions.

The input data 112, 122 may for example be derived from an image, a text, an audio recording, a diagram, or a combination thereof, to name but a few non-limiting examples. The input data 112, 122 may be pre-processed in order to be more easily processed by the machine learning model 100. The input data 112, 122 may for example assume a representation such as a vector, a matrix, a tensor or a combination thereof, to name but a few non-limiting examples.

The input data of a given modality may undergo a transformation in representation 114, 124 in the machine learning model 100. For example, an input image data represented by one or multiple matrices of intensity values, possibly in different color channels, may be transformed to one or multiple feature matrices where an entry may for example indicate the presence of a feature such as an edge in a certain orientation. A transformation may be carried out by an encoding stage 116, 126 that may for example convolve the image data 1142 with one or multiple different filter kernels 1144 to generate a feature matrix 1146 per filter kernel.

The feature matrices 1146 may optionally be reduced in dimensions in a pooling step. A pooling may comprise merging multiple neighboring entries in a feature matrix 1146 to a single entry in a pooled feature matrix 1148 of reduced size. Merging entries may for example be achieved by averaging entry values, taking a median, a maximum, or a combination thereof, to name but a few non-limiting examples.

The machine learning model 100 may comprise parameters that may be changed, for example during training. An example of a parameter can be an entry 1145 of a filter kernel 1144.

An input stage may for example generate an intermediate representation 114, 124.

The input data of a given modality may undergo multiple transformations in representation, for example multiple encoding stages. The encoding stages may comprise the steps of filtering using a convolution kernel 1144 and/or pooling.

Representations of two or more pieces of input data 112, 122 may be combined to a joint representation 132 in a joining stage 130. Joining of representations may be achieved by adding, interlacing, multiplying, computing a cross product, or a combination thereof, to name but a few non-limiting examples. Joining may involve a step of preparation of one or multiple representations, for example, a rearrangement of entries of a vector, matrix, tensor, an adjustment of value ranges of entries, or a combination thereof, to name but a few non-limiting examples. A joint representation 132 may be indicative of at least a part or all pieces of input data 112, 122 provided to the machine learning model 100 and/or one of the intermediate representations 114, 124 of the input data.

The branches of the machine learning model 100 that lead from the input data to the joining stage 130 and/or the joint representation 132 may be referred to as encoding branches 110, 120.

On the other side of the joining stage 130, one or more decoding branches 140, 150 can be arranged in the machine learning model 100. A decoding branch 140, 150 may comprise one or more decoding stages 146, 156 that generate a representation from an intermediate representation 144, 154 derived from the joint representation. A decoding stage 146, 156 may involve an expanding functionality such as un-pooling or transpose convolution or another procedure of that kind that may for example constitute one step in transforming a feature matrix to a spatial arrangement of entries.

The decoding branches 140, 150 may for example transform, in one or more decoding stages 146, 156, the joint representation to output data 142, 152.

The joint representation 132 may be transformed to another representation 162. This transformation may for example be achieved by a convolution with a filter kernel. The transformation may in addition or in the alternative be achieved by one or multiple fully connected layers. A fully connected layer may be understood as a convolution with one filter kernel that is of the same or similar size as the joint representation, possibly after a rearrangements of values in the joint representation. For example, the joint representation may be a three dimensional tensor and may be rearranged to a two-dimensional matrix to which a convolutional filter kernel of the same size as the matrix is applied. Multiple of such convolutions with multiple, possibly different, filter kernels are possible.

Additionally or alternatively, one or multiple steps of pooling may be carried out to generate a representation 162. A pooling may involve merging entries by taking the maximum across entries, the mean, the median, or a combination thereof, to name but a few non-limiting examples. A pooling may in addition or in the alternative involve a weighting of entries, for example by attention-weighted pooling.

Pooling and convolving may for example alternate in the generation of representation 162 and/or one step of pooling may be done before and/or after more than one successive convolutions.

Figure 2:
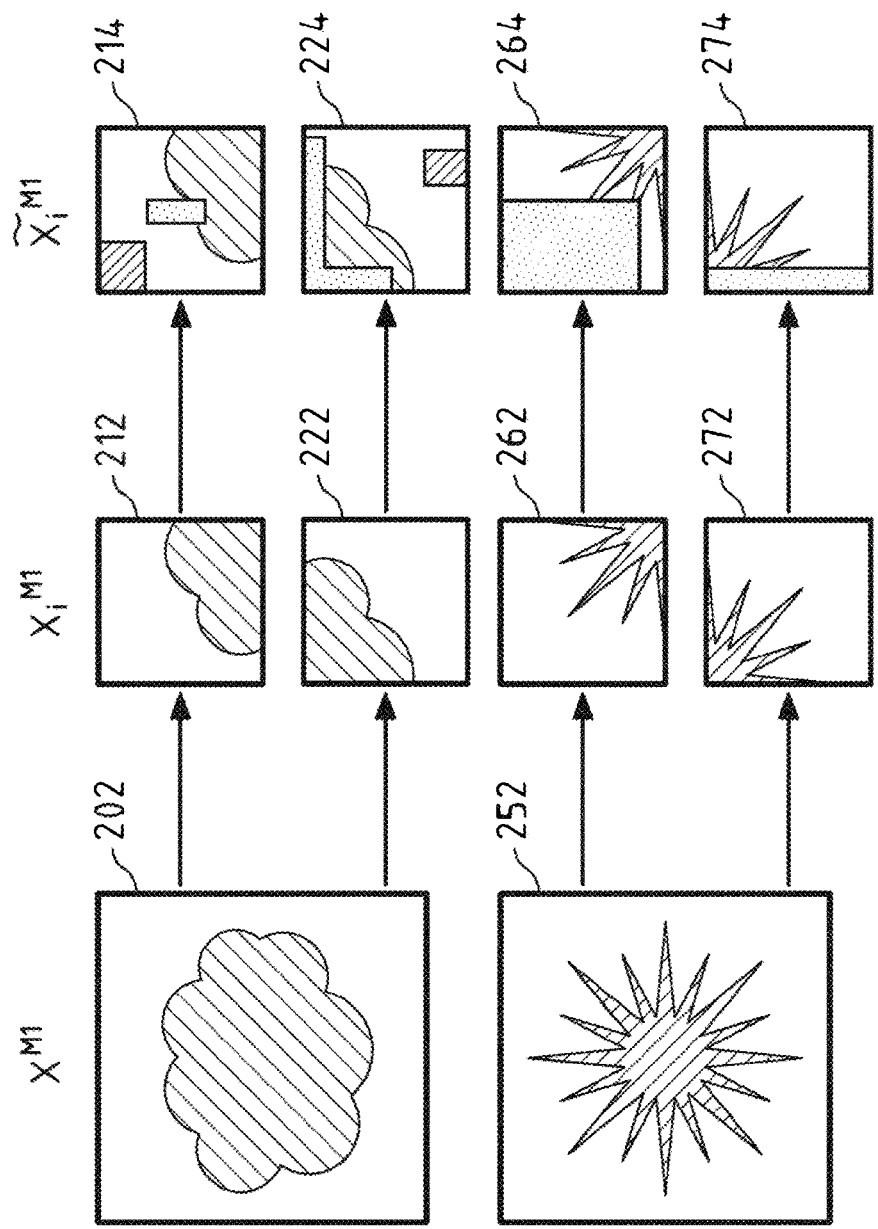
FIG. 2 shows a schematic block diagram of a method for data preparation for training a machine learning model, according to some embodiments.

FIG. 2 shows a schematic block diagram of an example procedure to generate input data, as used by example embodiments of all exemplary aspects. Input image data may be obtained by editing source image data. For example, the source image data may be a medical image obtained by, for example, an X-ray scan.

In the shown example, source image data 202, 252 is provided. The example shows a two-dimensional source image data. Higher-dimensional or one-dimensional source image data is possible as well. The source image data 202, 252 is cropped in a first step. The cropped image data 212, 222, 262, 272 is obtained. Cropped image data 212, 222, 262, 272 can for example be informative of a part of the source image data and may for example be of smaller size than the source image data in at least one dimension.

Multiple cropped image data 212, 222, 262, 272 may be obtained from the same source image data 202, 252. Cropped image data 212, 222, 262, 272 may differ among them in the source data they are derived from, the size, the part of the source image data 202, 252 preserved in the cropped image data 212, 222, 262, 272, etc.

Additionally or alternatively, corrupted image data 214, 224, 264, 274 may be generated. For example, the cropped image data 212, 222, 262, 272 may be corrupted to form corrupted image data 214, 224, 264, 274. Corrupting may comprise for example a step of masking parts of the cropped image data 214, 224, 264, 274 as shown in FIG. 2. Many other ways to corrupt image data are imaginable such as adding noise, blurring, changing contrast, or a combination thereof, to name but a few non-limiting examples.

More than one corrupted image data 214, 224, 264, 274 may be obtained from a single cropped image data 214, 224, 264, 274, possibly by using different ways of corrupting. It is in addition or in the alternative possible to invert the steps of cropping and corrupting and/or apply multiple steps of corrupting and/or cropping. It is in addition or in the alternative possible to corrupt the source image data and afterwards crop it, execute multiple steps of either corrupting and/or cropping in different order, or other ways to edit the source image data.

The corrupted image data 214, 224, 264, 274 may form the input to a machine learning model 100.

Figure 3:
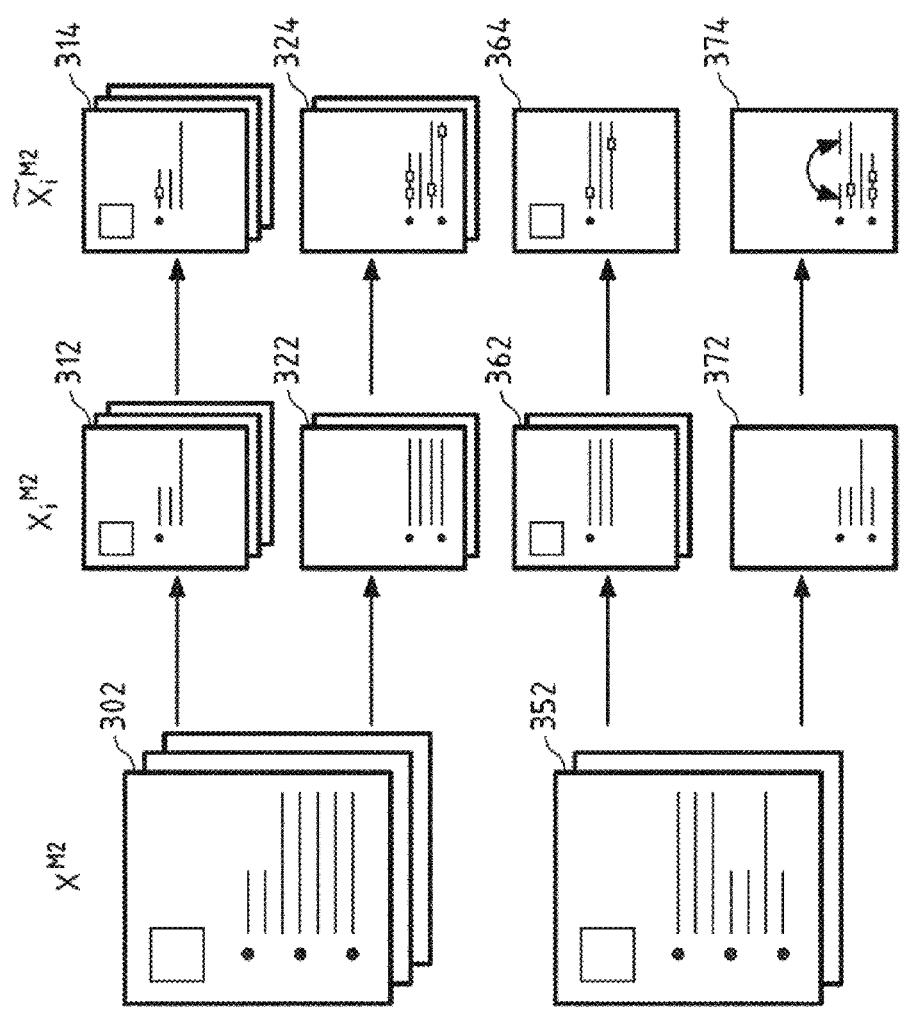
FIG. 3 shows a schematic block diagram of a method for data preparation for training a machine learning model, according to some embodiments.

FIG. 3 shows a similar procedure for generating input data for a machine learning model 100 as FIG. 2 that may be used by example embodiments according to all exemplary aspects. In this case, the source data 302, 352 is of the modality text. Again, input text data may be obtained by editing source text data. For example, the source text data may be indicative of an electronic medical record.

Again, a step of cropping may be applied to the text data which may comprise removing text parts, for example certain sentences, paragraphs, pages or a combination thereof, to name but a few non-limiting examples from the source text data 302, 352. Through cropping, cropped text data 312, 322, 362, 372 can be generated. More than one piece of cropped text data may be obtained from the same source text data 302, 352.

Further, corrupted text data 314, 324, 364, 374 may be obtained in the process of data corruption. For example, the cropped text data 312, 322, 362, 372 may be corrupted by e.g., masking, changing the order to sentences, words, paragraphs, exchanging words by synonyms or entirely different words, or a combination thereof, to name but a few non-limiting examples to obtain corrupted text data 314, 324, 364, 374.

Again, the steps of corrupting and cropping may be executed in arbitrary order, multiple steps of both corrupting and cropping may be applied in succession.

The resulting corrupted text data 314, 324, 364, 374 may be obtained by a machine learning model 100.

Source image data and source text data may partially relate to the same patient. For example, it may be possible that source image data 202 and source text data 302 may comprise information about the same patient P1 and that source image data 252 and source text data 352 may comprise information about the same patient P2. P1 and P2 may be different patients. P1 and P2 may be the same patient.

Figure 4:
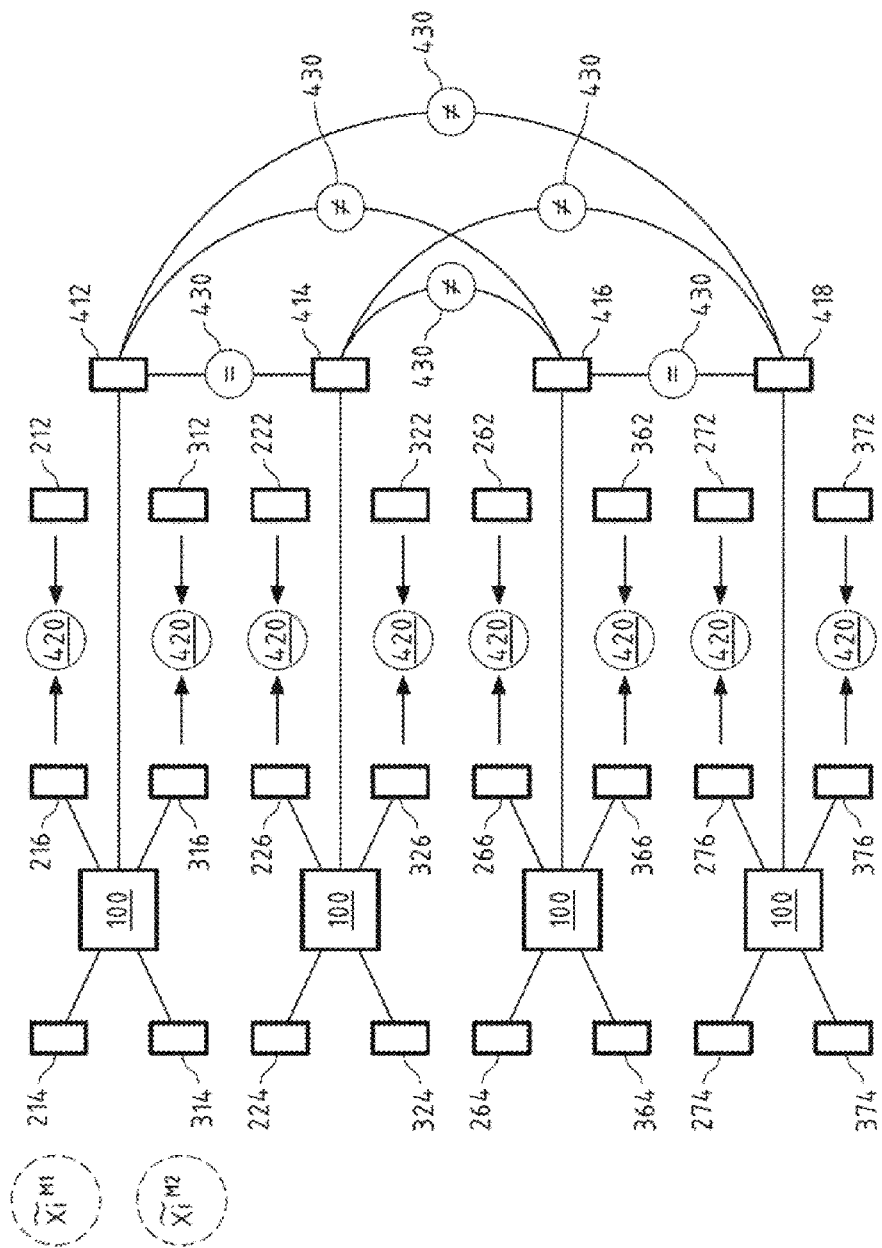
FIG. 4 shows a schematic block diagram of a method for evaluating a machine learning model, according to some embodiments.

FIG. 4 shows a schematic block diagram of the evaluation of a machine learning model 100.

Input data 214, 224, 264, 274, 314, 324, 364, 374 may be provided to a machine learning model 100. The input data may or may not have been generated in a way similar or identical to the process outlined in FIG. 2 and/or FIG. 3.

The machine learning model 100 may for example generate output data 216, 226, 266, 276, 316, 326, 366, 376 at least partially based on the input data.

The output data 216, 226, 266, 276, 316, 326, 366, 376 may be evaluated using a loss function 420. The loss function may take as arguments at least one or multiple pieces of output data 216, 226, 266, 276, 316, 326, 366, 376 and reference data. The reference may be a less edited version of the input data, which may be referred to as unedited source data.

In the example shown in FIG. 4, the reference data may be the cropped source data 212, 222, 262, 272, 312, 322, 362, 372.

The loss function 420 may for example assess a deviation between certain output data 216 (or 226, 266, 276, 316, 326, 366, 376) and certain reference data 212 (or 222, 262, 272, 312, 322, 362, 372). The loss function may for example carry out an element-wise different operation between entries of the output and reference data, followed by the computation of an absolute value and a sum. Many other difference metrics are possible that may depend on the type of representation of the output and reference data. For example, if both are vector-valued, they may be compared in a correlation, cosine-distance, or a combination thereof, to name but a few non-limiting examples.

Depending on the output of the loss function 420, the performance of the machine learning model may be assessed. If for example, the loss function 420 assesses the deviation between the output data 216 (or 226, 266, 276, 316, 326, 366, 376) and the reference data 212 (or 222, 262, 272, 312, 322, 362, 372) that represents the desired output data and the output is high, this may indicate the machine learning model needs to be adjusted.

Adjusting a machine learning model 100 in response to the output of a loss function 420 may be called training. Many training iterations with different input data, output data and reference data may be executed to achieve a satisfactory performance of the machine learning model 100.

The loss function 420 and the choice of reference data can for example play an important role in the training of the machine learning model 100. In this example, the reference data is the non-corrupted input data 212, 222, 262, 272, 312, 322, 362, 372 which may lead to a machine learning model 100 that is able to reconstruct data from incomplete input data.

Additionally or alternatively to the evaluation of the machine learning model 100 based on the output data 216, 226, 266, 276, 316, 326, 366, 376, the machine learning model 100 may be evaluated based on a certain representation. Such a representation may be an intermediate representation 114, 124, 144, 154 in an encoding branch 110, 130 of FIG. 1 and/or in a decoding branch 140, 150 of FIG. 1 showing an example of the machine learning model 100 and/or it may be a joint representation 132.

It may in particular be advantageous to evaluate a first representation 114, 124, 144, 154, 132 (see FIG. 1) which is at least partially dependent on first input data on the basis of a second representation 114, 124, 144, 154, 132 that is at least partially dependent on second input data. First and second input data may both comprise multiple pieces of input data such as input data from a first and a second modality and potentially of more than two modalities. For example, the first and second input data may both comprise text data and image data.

A representation 114, 124, 144, 154, 132 as shown in FIG. 1 may be transformed to a different representation 162 (or 412, 414, 416, 418) before being compared to another representation 114, 124, 144, 154, 132.

In an example, multiple joint representations 132 at least partially dependent on different input data may be transformed to multiple transformed representations 412, 414, 416, 418. The transformed representations 412, 414, 416, 418 may be derived on or be identical to the joint representations 132. 412, 414, 416, 418 may additionally or alternatively derive from or be identical to another intermediate representation 114, 124, 144, 154.

The multiple transformed representations 412, 414, 416, 418 may be obtained by sequentially providing different input data to the machine learning model 100. The multiple transformed representations 412, 414, 416, 418 may be compared among them. The comparison may depend on the type of input data the transformed representations are respectively based on. In a given example, the transformed representations 412, 414 may at least partially depend on input data that is derived from the same first source data. On the other hand, the transformed representations 412, 414 may at least partially depend on input data that is derived from the second source data. The first and second source data may be different from another.

A representation deviation metric 430 may be used to compare two given representations and/or two given transformed representations 412, 414, 416, 418. The representation deviation metric 430 may for example quantify the deviation between two representations and/or transformed representations 412, 414, 416, 418. Alternatively, it may quantify similarity.

It can be advantageous to carry out a different comparison between two representations depending on whether the representations derive from input data based on the same source data or whether the representations derive from input data based on different source data. For example, the representation deviation metric 430 may evaluate a deviation between representations that derive from input data based on the same source data and the deviation metric 430 may evaluate a similarity between representations that derive from input data based on different source data.

The representation deviation metric 430 may be substantially unchanged for all representations but the post-processing of the output of the representation deviation metric 430 may differ depending on the source data involved in the generation of the representations.

By comparing representations and rewarding similar representations for the same source data and rewarding dissimilar representations for different source data, a better separation in representation may be achieved for different source data and the machine learning model's 100 performance may be improved.

Example embodiments according to all exemplary aspects enable a machine learning model 100 to be trained with input data 112, 122, 214, 314, 224, 324, 264, 364, 274, 374 from at least two modalities. Additionally, the machine learning model 100 can be trained with test data 212, 312, 222, 322, 262, 362, 272, 372. The machine learning model can be trained in a way that it can generate output data 142, 152, 212, 312, 222, 322, 262, 362, 272, 372 in one or more modalities, in particular in different modalities from the input data 112, 122, 214, 314, 224, 324, 264, 364, 274, 374.

The machine learning model 100 can be trained with input data 112, 122, 214, 314, 224, 324, 264, 364, 274, 374 that is edited source data and with test data 212, 312, 222, 322, 262, 362, 272, 372 which is unedited, meaning at least less edited than the input data 112, 122, 214, 314, 224, 324, 264, 364, 274, 374. By doing so, the machine learning model 100 can learn to remove flaws in the input data 112, 122, 214, 314, 224, 324, 264, 364, 274, 374. In particular, the machine learning model 100 can learn to complete missing parts of the input data 112, 122, 214, 314, 224, 324, 264, 364, 274, 374 in the output data 142, 152, 212, 312, 222, 322, 262, 362, 272, 372. This functionality may be called auto-completion.

The machine learning model has been trained on input data 112, 122, 214, 314, 224, 324, 264, 364, 274, 374 from two or more modalities, in particular different modalities, at once in at least some of the training steps. The architecture of the machine learning model may force it to generate a joint representation of two or more pieces of input data 112, 122, 214, 314, 224, 324, 264, 364, 274, 374 in order to generate any output data 142, 152, 212, 312, 222, 322, 262, 362, 272, 372. As an effect, the machine learning model can learn to generate output data 142, 152, 212, 312, 222, 322, 262, 362, 272, 372 of one first modality that contains information from input data 112, 122, 214, 314, 224, 324, 264, 364, 274, 374 in one or more second modalities. The second modalities may at least in part differ from the first modality. The machine learning model 100 trained using the method according to the subject matter may thus not only enable auto-completion of input data 112, 122, 214, 314, 224, 324, 264, 364, 274, 374 in a first modality using the using input data 112, 122, 214, 314, 224, 324, 264, 364, 274, 374 in that first modality alone. The machine learning model 100 may also be capable to auto-complete input data 112, 122, 214, 314, 224, 324, 264, 364, 274, 374 based on input data input data 112, 122, 214, 314, 224, 324, 264, 364, 274, 374 of a second modality that may be different from the first modality. Information from two input data input data 112, 122, 214, 314, 224, 324, 264, 364, 274, 374 of different modalities may thus be merged in a joint representation and/or in output data 142, 152, 212, 312, 222, 322, 262, 362, 272, 372 in particular generated from that joint representation.

In addition, the trained machine learning model 100 may be capable of obtaining input data 112, 122, 214, 314, 224, 324, 264, 364, 274, 374 of a first modality and generate output data 142, 152, 212, 312, 222, 322, 262, 362, 272, 372 in a second modality. The second modality may be different from the first modality. The trained machine learning model 100 may thus be capable of transforming data from one modality to another. The trained machine learning model 100 may in particular be capable of generating a joint representation on a single piece of input data.

The training of the machine learning model 100 can span a multitude of training steps. In a given step, the machine learning model 100 generates at least one joint representation from two or more pieces of input data. By training the machine learning model in order to create different joint representations for input data that stem from the same source data and/or training it to create similar joint representations for input data that stem from different source data, the machine learning model 100 may learn appropriate joint representations without needing to label the data.

The trained machine learning model 100 may be used in a way to detect uncertain information. For example, if parts of the input data 112, 122, 214, 314, 224, 324, 264, 364, 274, 374 are altered by the machine learning model, this is an indication that the respective piece did not fit with the rest of the input data. An erroneous piece of input data may be detected that way. It is also possible to repeatedly present input data 112, 122, 214, 314, 224, 324, 264, 364, 274, 374 to the machine learning model 100 and change it slightly between such presentations. The output data 142, 152, 212, 312, 222, 322, 262, 362, 272, 372 may vary more strongly in some parts than in others. The very variable parts may be uncertain and/or wrong in the input data.

Figure 5:
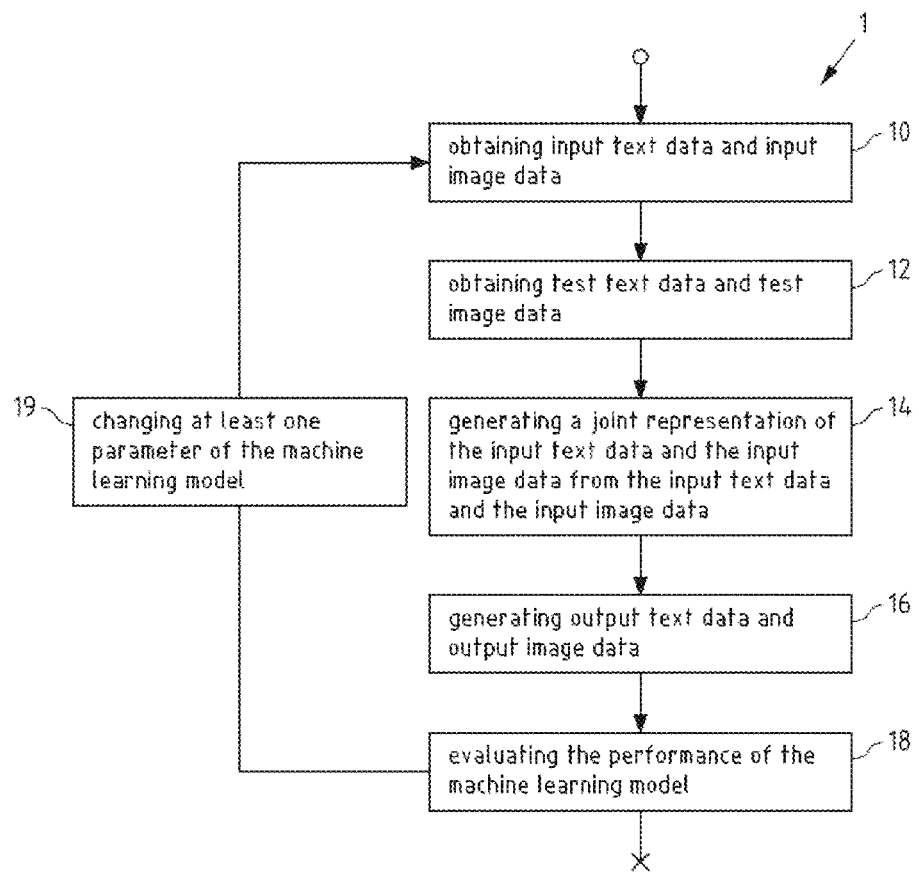
FIG. 5 shows a flowchart showing an example embodiment of a method, according to some embodiments.

FIG. 5 shows a flowchart 1 showing an example embodiment of a method according to an exemplary aspect. This flowchart 1 may for instance be performed by a server, a computing unit, and/or an electronic device.

In a first step 10, input text data indicative of at least partially edited source text data for training of a machine learning model is obtained and input image data indicative of at least partially edited source image data for training of the machine learning model is obtained, e.g., by receiving it respectively.

In an optional second step 12, test text data indicative of at least partially unedited source text data for training of the machine learning model is obtained and test image data indicative of at least partially unedited source image data for training of the machine learning model is obtained, e.g., by receiving it as input.

In an optional third step 14, a joint representation of the input text data and the input image data from the input text data and the input image data is generated depending at least on one parameter influencing the machine learning model, wherein the joint representation enables deriving output text data and output image data.

In an optional fourth step 16, output text data indicative of at least a part of the unedited source text data and output image data indicative of at least a part of the unedited source image data based, at least in part, on the joint representation of the input text data and the input image data, and depending at least on one parameter influencing the machine learning model is generated.

In an optional fifth step 18, the performance of the machine learning model 100 is evaluated by computing a first loss function indicative of a deviation between the output text data and the test text data and the machine learning model is evaluated evaluating by computing a second loss function indicative of a deviation between the output image data and the test image data.

In an optional sixth step 19, the machine learning model is evaluated by e.g., a loss function. The machine learning model may in this step be adapted. In particular, at least one parameter of the machine learning model 100 may be changed and/or adapted. Such a parameter may for example be a weight of an edge of an artificial neural network, an entry of a convolutional filter kernel, both and/or another parameter. In case the machine learning model 100 comprises an artificial network, a backpropagation procedure can be used to change parameters of the machine learning model 100.

The training of the machine learning model 100 may be stopped depending on the evaluation of the machine learning model 100. For example, if the loss function meets a criterion, the learning may be stopped. The criterion may for example be a certain threshold to be crossed. For example, if the loss function evaluates a deviation between output data and test data, the criterion may be that the loss function output is lower than a certain threshold. The criterion may alternatively or additionally be defined across multiple iterations of the machine learning model, for example with different input data per iteration.

It will be understood that at least some of the steps 10 to 19 may for instance be performed and/or controlled by different entities. For instance, steps 10 and 12 may for instance be performed and/or controlled by at least one computing device. Then, step 14 may for instance be performed and/or controlled by a server. Steps 16 and 18 may for instance be performed either by a mobile computing device or a server.

Figure 6A:
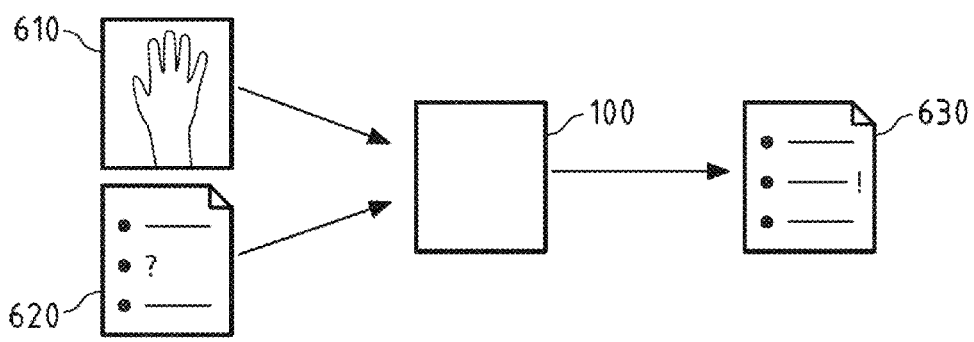
FIG. 6a shows a schematic block diagram of a method of using a trained machine learning model, according to some embodiments.

FIG. 6a shows a mode of using a trained machine learning model 100. The machine learning model 100 may in this example have been trained with many different pieces of input data 112, 122. For example, the input data used in training may have comprised image data indicative of medical images from different patients and text data indicative of electronic medical records of different patients.

The trained machine learning model 100 may be used with new input image data 610 and/or input text data 620. The input image data 610 and/or the input text data 620 may not have been obtained by the machine learning model 100 before.

The machine learning model can for example, based at least partially on the input image data 610 and/or the input text data 620, generate output data 630. The output data 630 may be of the modality text but could in addition or in the alternative be of an entirely different modality.

In some cases, the output text data 620 may comprise information not present in the input text data 620.

Figure 6B:
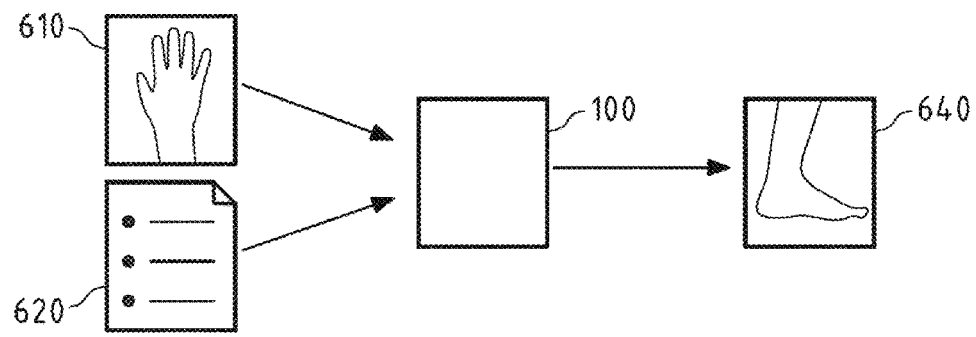
FIG. 6b shows a schematic block diagram of a method of using a trained machine learning model, according to some embodiments.

In a different embodiment, FIG. 6b shows the usage of a trained machine learning model 100.

Again input image data 610 and/or input text data 620 are obtained by the machine learning model 100 and the machine learning model 100 generates output data 640. The output data 640 may be of the modality image, for example.

The output image data 640 may comprise (e.g. contain) information not present in the input image data 610.

Figure 6C:
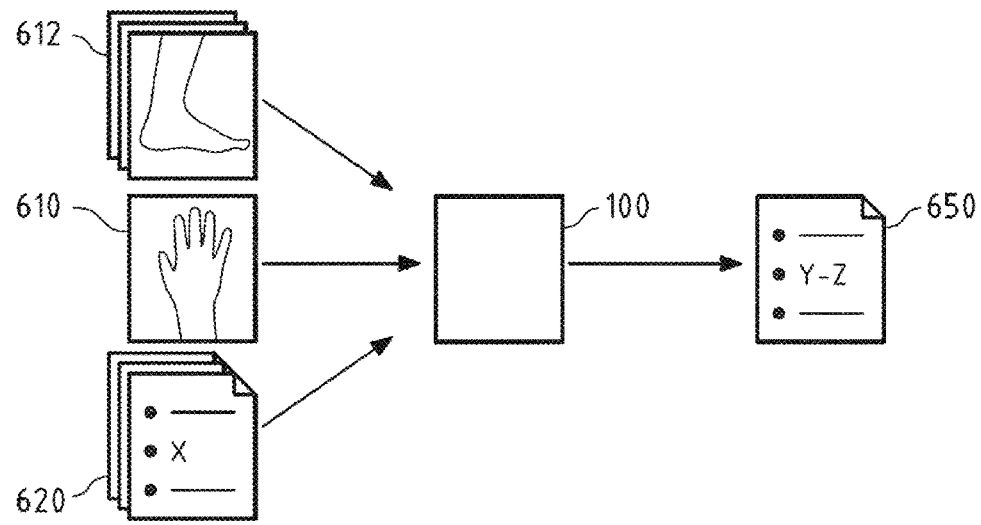
FIG. 6c shows a schematic block diagram of a method of using a trained machine learning model, according to some embodiments.

In another example, FIG. 6c shows a possible usage of the machine learning model 100 that obtains multiple pieces of input data. Input text data 620 is obtained by the machine learning model 100 and first input image data 610 and second input image data 612.

Multiple instances of the second input image data 612 and the input text data 620 may be obtained by the machine learning model in separate iterations of generating output data. At least one of the second input image data 612 and the input text data 620 may be changed between steps. For example, random or deterministic changes can be made between iterations to the second input image data 612 and/or the input text data 620, for example e.g. by any of the procedures for corrupting the respective data. In this way, multiple instances of output data may be generated in multiple iterations for the same input data which is augmented by artificially changing it between iterations.

In the multiple output data instances, parts may be identified that vary strongly between iterations. These may be classified as uncertain. A variability may be deemed "strong" based on the expected value range known for the type of data. Alternatively or additionally, a variability may be estimated as being strong if the considered part of the output data varies more strongly than other parts of the output data.

For some parts of the output data, an estimated range of values may be derived from the multiple pieces of output data generated across multiple iterations which slightly changing the input data. For example, a parameter such as the age of a patient may be estimated in a certain range. Alternatively, if the output data is of the modality image, a range of possible intensity values for a given region may be obtained.

While FIG. 6c shows output data of the modality text, the trained machine learning model may be used to generate output data of the modality image or another modality that has been used during training.

Figure 7A:
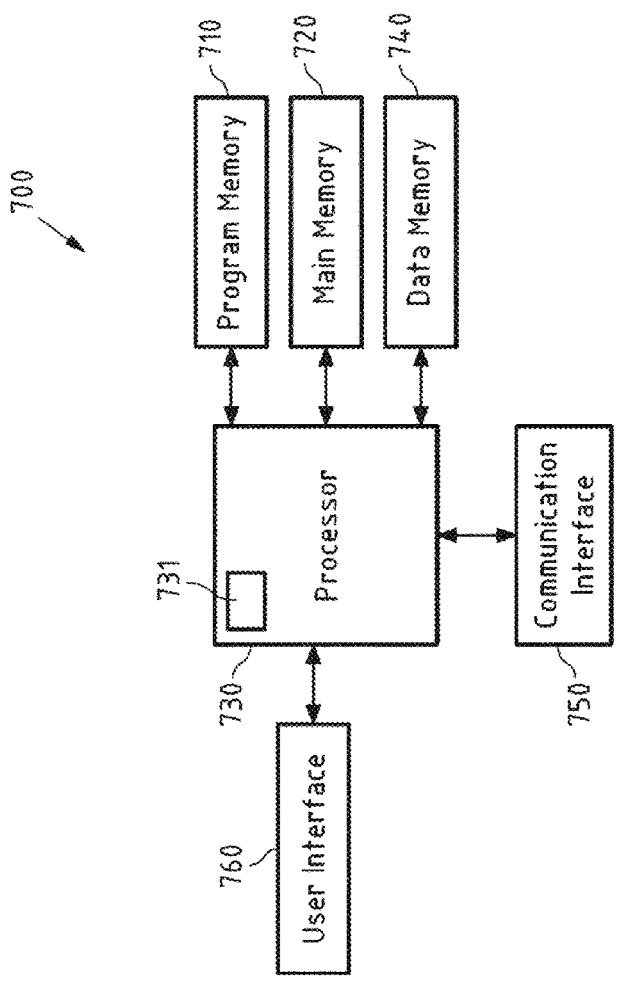
FIG. 7a a schematic block diagram of an apparatus configured to perform the method, according to some embodiments.

FIG. 7a is a schematic block diagram of an apparatus 700 according to an exemplary aspect, which may for instance represent a computing device, a server, an electronic device or a combination thereof, to name but a few non-limiting examples. Apparatus 700 may perform and/or control the method according to the first exemplary aspect.

Apparatus 700 comprises a processor 730, working memory 720, program memory 710, data memory 740, communication interface(s) 750, an optional user interface 760 and optionally other components.

Apparatus 700 may for instance be configured to perform and/or control or comprise respective means (at least one of 710 to 760) for performing and/or controlling the method according to all exemplary aspect. Apparatus 700 may as well constitute an apparatus comprising at least one processor (730) and at least one memory (710) including computer program code, the at least one memory and the computer program code configured to, with the at least one processor, cause an apparatus, e.g., apparatus 700 at least to perform and/or control the method according to all exemplary aspects.

Processor 710 may for instance comprise a neural processing unit 731 as a functional and/or structural unit. The neural processing unit 731 may allow to implement at least one encoding stage 116, 126 of FIG. 10r at least one decoding stage 146, 156 of FIG. 1 and/or the joining stage 130 of the machine learning model 100 of FIG. 1. Processor 730 may for instance further control the memories 710, 720 740, the communication interface(s) 750, the optional user interface 760 and/or other components.

Processor 730 may for instance execute computer program code stored in program memory 710, which may for instance represent a computer readable storage medium comprising program code that, when executed by processor 730, causes the processor 730 to perform the method according to all exemplary aspect.

Processor 730 (and in addition or in the alternative any other processor mentioned in this specification) may be a processor of any suitable type. Processor 730 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC (s)), or one or more computer(s). The relevant structure/hardware has been programmed in such a way to carry out the described function. Processor 310 may for instance be an application processor that runs an operating system.

Program memory 710 may in addition or in the alternative be included into processor 730. This memory may for instance be fixedly connected to processor 730, or be at least partially removable from processor 730, for instance in the form of a memory card or stick. Program memory 710 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 710 may comprise an operating system for processor 730. Program memory 710 may comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 730 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store source data of different modalities, edited source data, cropped, corrupted data, or a combination thereof, to name but a few non-limiting examples. Data elements stored in data memory 740 may for instance be informative of one or multiple patients and comprise data indicative of images, texts, electronic medical records, or a combination thereof, to name but a few non-limiting examples and/or references to such data.

Communication interface(s) 750 enable apparatus 700 to communicate with other entities, e.g., with a server. The communication interface(s) 750 may for instance comprise a wireless interface, e.g., a cellular radio communication interface and/or a WLAN interface) and/or wire-bound interface, e.g., an IP-based interface, for instance to communicate with entities via the Internet. Communication interface(s) may enable apparatus 700 to communicate with other entities.

User interface 760 is optional and may comprise a display for displaying information to a user and/or an input device (e.g., a keyboard, keypad, touchpad, mouse, or a combination thereof, to name but a few non-limiting examples.) for receiving information from a user.

Some or all of the components of the apparatus 700 may for instance be connected via a bus. Some or all of the components of the apparatus 700 may for instance be combined into one or more modules.

Figure 7B:
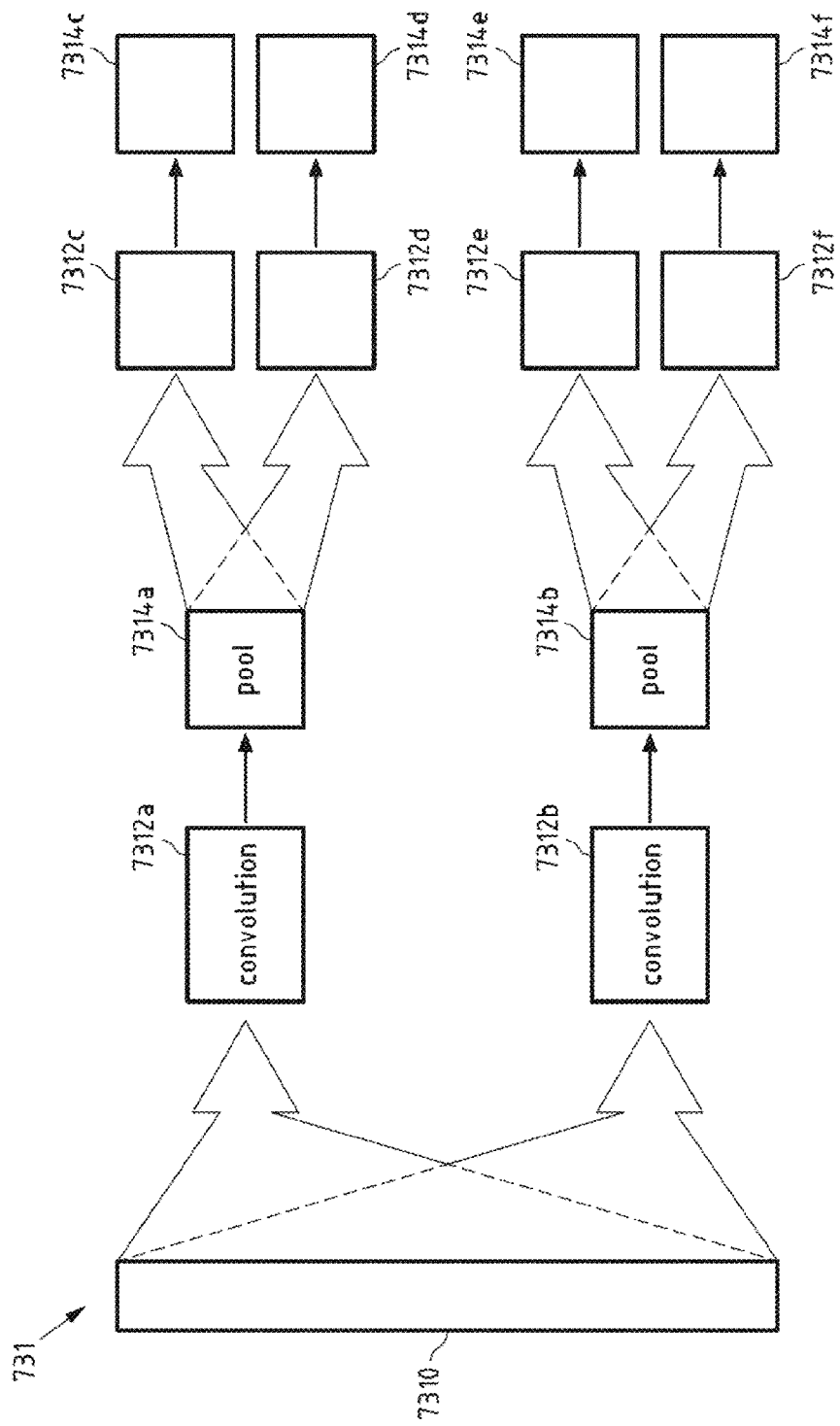
FIG. 7b a part of a neural processing unit of an apparatus configured to perform the method, according to some embodiments.

FIG. 7b shows a part of a neural processing unit 731 according to an exemplary, non-limiting aspect, e.g., the neural processing unit 731 of apparatus 700 of FIG. 7a. The neural processing unit 731 can assume many other forms and/or fulfill different purposes.

The neural processing unit 731 may comprise an input layer 7310. The input layer 7310 may obtain input data. The input layer may comprise multiple entries. The entries of the input layer 7310 may be arranged in a one-dimensional, two-dimensional, three-dimensional or higher-dimensional fashion. An entry in the input layer 7310 of the neural processing unit 731 may for example represent a feature value, a pixel intensity in an image, a symbol in a text, or another observation.

The input layer 7310 may be connected to one or more convolutional units 7312a, b that may for example apply a convolution with a convolutional kernel to the input layer 7310. Multiple convolutional units 7312a, b, for example using different convolutional kernels, may be applied to the input layer 7310. A convolutional unit 7312 may for example generate a feature matrix of the input data provided to the neural processing unit 731 through the input layer 7310. A feature matrix may be a one-, two-, three- or higher-dimensional arrangement of entries.

A convolutional unit 7312 may be followed by a pooling unit 7314. A pooling unit 7314 may for example combine multiple entries in the feature matrix to a single entry in a pooled matrix generated by the pooling unit 7314. For example, a pooling unit 7314 may combine multiple entries by applying a maximum operation to multiple entries, for example to four entries of which a scalar maximum value is taken over into the pooled matrix.

The convolution unit 7312a, b and/or the pooling units 7314a, b may be chained to a series of convolution and pooling units.

It is also possible, to use a series of units such as shown in FIG. 7b in the opposite direction from what is described above. That is, the feature matrices may also be obtained (e.g. received) by unpooling units that essentially execute the inverse function to a pooling unit 7314. And an unpooling unit may be followed by an inverse convolution unit, such as a transposed convolution unit that carries out a transposed convolution.

Figure 7C:
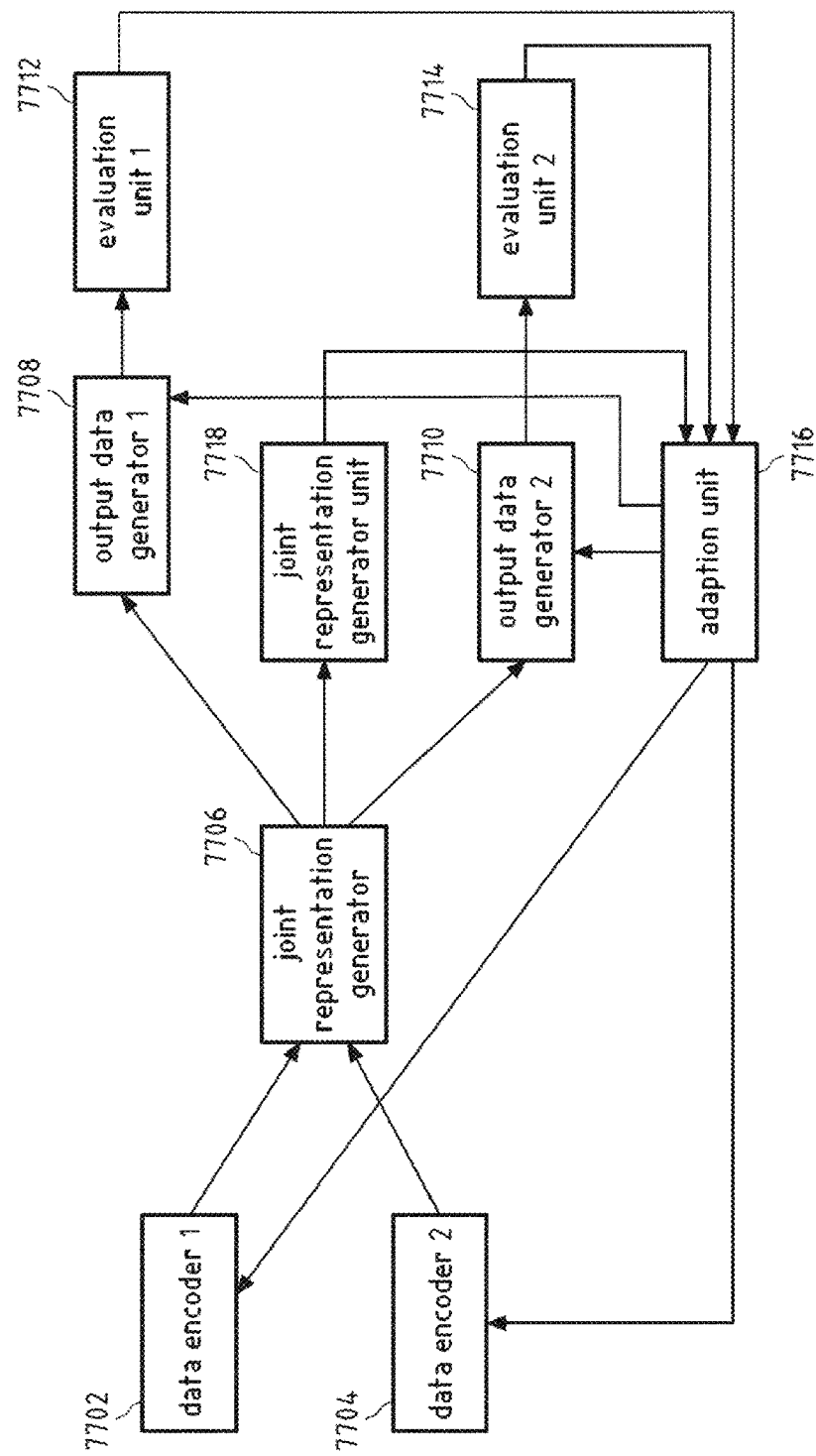
FIG. 7c shows a block diagram of an apparatus configured to perform the method, according to some embodiments.

FIG. 7c shows a block diagram according to an exemplary aspect of the subject matter. The functional and/or structural entities of FIG. 7c may for instance be comprised in addition or in the alternative to the ones of FIG. 7b by apparatus 700 of FIG. 7a.

The machine learning model 100 may optionally comprise a first data encoder 7702 for a first modality. The machine learning model 100 may optionally further comprise a second data encoder 7704 for a second modality.

The data encoder(s) 7702, 7704 may receive input data. The data encoder(s) 7702, 7704 may generate a representation of the input data. For example, the data encoder(s) 7702, 7704 may comprise an artificial neural network. For example, the data encoder(s) 7702, 7704 may at least partly be implemented as program code, for example on a program memory in a computing device. Additionally or alternatively, the data encoder(s) 7702, 7704 may at least partly be implemented in hardware, for example as an FPGA. It is possible that the data encoder(s) 7702, 7704 is additionally or alternatively implemented at least partly as a neural processing unit 731.

The machine learning model 100 may optionally further comprise a joint representation generator 7706. The joint representation generator 7706 may obtain (e.g., receive) at least two or possibly more representations. The representations obtained by the joint representation generator 7706 may for example stem from data encoder(s) 7702, 7704. The joint representation generator 7706 may generate one or multiple joint representations from the two or more representations obtained from the data encoder(s) 7704, 7706. The joint representations may comprise information about both the representation generated by a first data encoder 7702 and the representation generated by the second data encoder 7704. For example, the joint representation generator 7706 may at least partly be implemented as program code, for example on a program memory in a computing device. Additionally or alternatively, the joint representation generator 7706 may at least partly be implemented in hardware, for example as an FPGA. It is possible that the joint representation generator 7706 is additionally or alternatively implemented at least partly as a neural processing unit 731.

The machine learning model 100 may optionally further comprise one or more output data generator(s) 7708, 7710. An output data generator 7708, 7710 may obtain a joint representation, for example from the joint representation generator 7706. The output data generator(s) 7708, 7710 may generate output data at least partially based on the joint representation. For example, the output data generator(s) 7708, 7710 may at least partly be implemented as program code, for example on a program memory in a computing device. Additionally or alternatively, the output data generator(s) 7708, 7710 may at least partly be implemented in hardware, for example as an FPGA. It is possible that the output data generator(s) 7708, 7710 is additionally or alternatively implemented at least partly as a neural processing unit 731. In particular, the output data generator(s) 7708, 7710 may at least partly be implemented as the example of a neural processing unit 731 shown in FIG. 7b with an inverted data flow from right to left and pooling units 7314 replaced by un-pooling units and convolution units 7312 replaced by transposed convolution units.

The machine learning model 100 may optionally further comprise one or more evaluation unit(s) 7712, 7714. An evaluation unit 7712, 7714 may obtain output data, for example from one or more output data generators 7708, 7710. The evaluation unit(s) 7712, 7714 may further obtain (e.g. receive) test data and/or desired output data. The evaluation unit(s) 7712, 7714 may for example evaluate the performance of the machine learning model 1000 by computing a loss function e.g., based on the output data and/or the test data. For example, the evaluation unit(s) 7712, 7714 may at least partly be implemented as program code, for example on a program memory in a computing device. Additionally or alternatively, the evaluation unit(s) 7712, 7714 may at least partly be implemented in hardware, for example as an FPGA. It is possible that the evaluation unit(s) 7712, 7714 is additionally or alternatively implemented at least partly as a neural processing unit 731.

The machine learning model 100 may optionally further comprise one or more adaption unit(s) 7716. An adaption unit 7716 may for example obtain an output of an evaluation function. An adaption unit 7716 may further adapt the machine learning model 100. The adaption unit 7716 may for example adapt the machine learning model 1000 in dependence of the output of an evaluation unit 7712, 7714. In particular, the adaption unit 7716 may for example adapt the machine learning model by changing parameters of the machine learning model 100. The adaption unit 7716 may for example change parameters of the data encoder(s) 7702, 7704 of the machine learning model 100, the joint representation generator 7706 of the machine learning model 100 and/or the output data generator(s) 7708, 7710 of the machine learning model 100. For example, the adaption unit 7716 may change cause a change of weights of an artificial neural network comprised in the machine learning model 100, for example by using back propagation, for example based on the output data and/or the evaluation units 7712, 7714 and/or their outputs. For example, the adaption unit 7716 may at least partly be implemented as program code, for example on a program memory in a computing device. Additionally or alternatively, the adaption unit 7716 may at least partly be implemented in hardware, for example as an FPGA. It is possible that the adaption unit 7716 is additionally or alternatively implemented at least partly as a neural processing unit 731.

The machine learning model 100 may optionally further comprise one or more joint representation evaluation unit(s) 7718. A joint representation evaluation unit 7718 may receive obtain the joint representation from the joint representation unit 7706. The joint representation evaluation unit 7718 may obtain the joint representation in an altered version, for example pooled or otherwise processed. The joint representation evaluation unit 7718 may additionally or alternatively process the obtained joint representation. The joint representation evaluation unit 7718 may evaluate an obtained joint representation. For example, the joint representation evaluation unit 7718 may quantify a deviation between the obtained joint representation and a desired joint representation and/or quantify a deviation between the obtained joint representation and a joint representation obtained in a previous step. For example, the joint representation evaluation unit 7718 may at least partly be implemented as program code, for example on a program memory in a computing device. Additionally or alternatively, the joint representation evaluation unit 7718 may at least partly be implemented in hardware, for example as an FPGA. It is possible that the joint representation evaluation unit 7718 is additionally or alternatively implemented at least partly as a neural processing unit 731.

Data such as input data, representations generated by the data encoder(s) 7702, 7704, joint representations generated by the joint representation unit 7706, output data generated by output data generator(s) 7708, 7710 and/or outputs of evaluation unit(s) 7712, 7714 and/or other signals, such as commands for example for the adaption of certain parameters of the machine learning model generated by the adaption unit 7716, may be transferred between the components (such as data encoders 7702, 7704, joint representation unit 7706, output data generators 7708, 7710, evaluation units 7712, 7714) of the machine learning model 100. Such transmission of data and other signals may be achieved by communication interfaces 750 of the apparatus 700 of FIG. 7a, for example. A further possibility would be to implement two or more components on the same computing device (for example, a processor, an FPGA, a neural processing unit) and transfer data using the internal information transmission capability of the device.

For example, at least some of the components (such as data encoders 7702, 7704, joint representation unit 7706, output data generators 7708, 7710, and/or evaluation units 7712, 7714) may be implemented on the same device, the same PCB or in different devices such as a distributed system.

Figure 8:
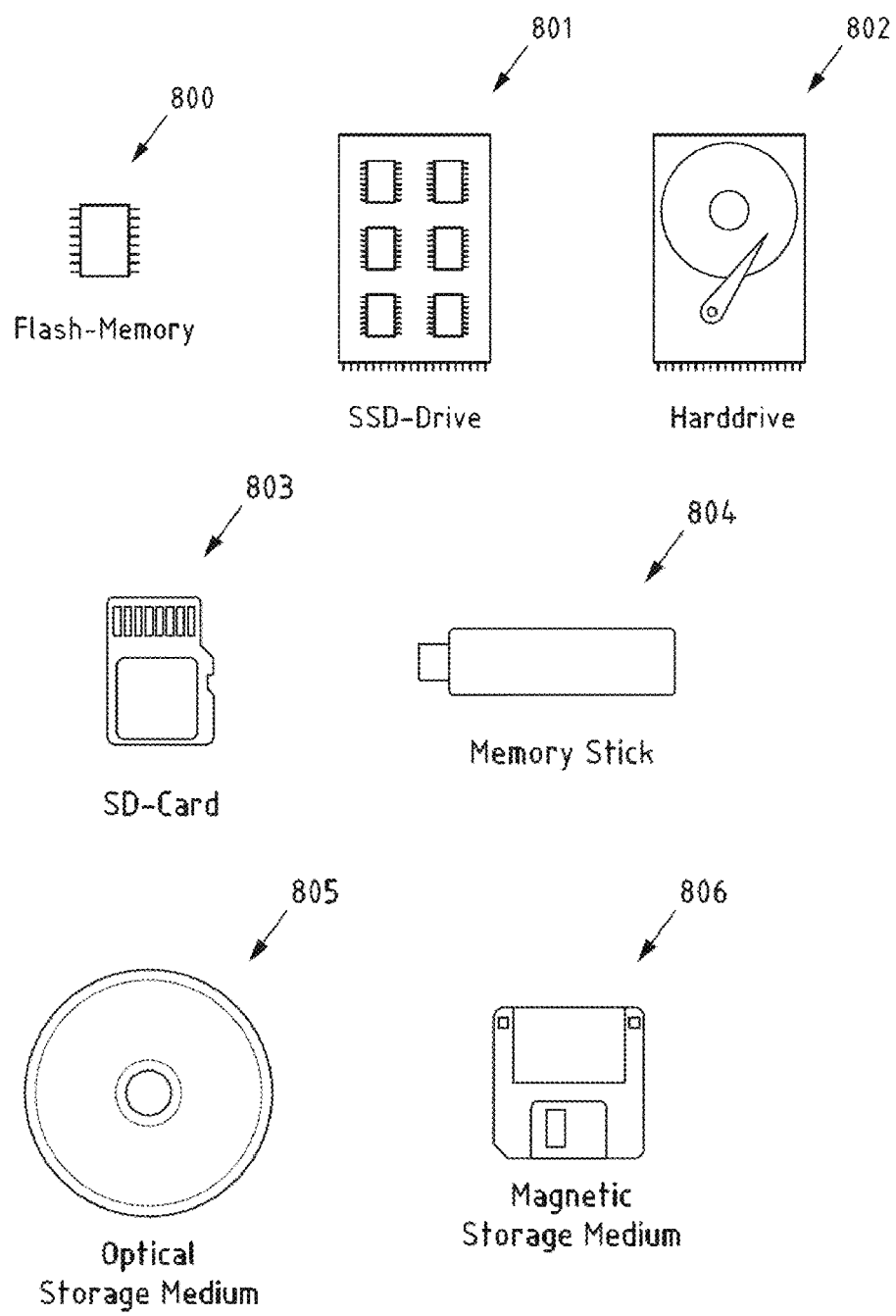
FIG. 8 shows examples of storage media, according to some embodiments.

FIG. 8 is a schematic illustration of examples of tangible and non-transitory computer-readable storage media according to the present invention that may for instance be used to implement memory 710, memory 720 and/or memory 740 of apparatus 700 of FIG. 7a. To this end, FIG. 8 displays a flash memory 800, which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

The following embodiments shall also be considered to be disclosed in conjunction with one or more or all exemplary aspects, as disclosed above.

Thus, by applying a versatile approach for representation learning, which can handle multiple modalities (text, image, audio, diagrams, social graphs, or a combination thereof, to name but a few non-limiting examples.) and account for missing values, it is possible to solve several relevant real-world challenges. Considering that a complete electronical health record (EHR) and/or electronic medical record (EMR) and a corresponding archive of radiology data (image data), is rather the exception then the rule, there is strong value-adding potential for artificial intelligence models and/or machine learning models that can cope with sparse and imperfect data.

Using a high-dimensional representation in a feature embedding at its core, the proposed invention can be used for example in the following scenarios.
1. Predicting missing EHR entries based on remaining EHR and/or radiological scan data ("autocomplete scenario")
2. Identify questionable EHR entries (corner cases according to previously learned embedding) and propose values with higher confidence. The clinician can accept or reject ("autocorrection scenario")

Contrastive learning is an active field within the domain of representation learning. It builds on the concept that a mathematical representation of visual features can be learned in an unsupervised manner. This means that images without labels can be used to create a generic, task-agnostic "base line" representation which is subsequently either fine-tuned or used directly to solve a very specific task (classification of images of a certain domain, e.g. common objects, chest CTs with and without COVID, skin lesions, whole slide images for digital pathology). The overall assumption is—the better the state of the embedding after pre-training, the more accurate is a classification model even with few labelled samples.

On the other spectrum there has been great progress in the domain of representation learning within natural language processing (NLP). New ways to build mathematical language representations that can capture concepts of context, question and answer or dialog between 2 individuals have seen great progress in the last years. Seminal progress was achieved by using a Bidirectional Encoder Representation from Transformer (BERT). Only to be followed a BERT model that was trained to capture content of Electronical Health Records. ClinicalBERT was then used to predict hospital readmission or in a version of ClinicalBERT_multi to "predict" disease diagnosis based on text input from EHR. The current state-of-the-art in NLP uses a similar concept as BERT, but has a much larger architecture and has been trained on massive data. The Generative Pre-trained Transformer GPT-3 has been released by OpenAI in mid-2020. GPT-3 is characterized with an impressive versatility. It covers translation, text summary, text completion (up to entire paragraphs), understanding of ambiguous phrases etc. This was achieved by a battery of routines as part of the training. One is to optimize against a multi-task criterium or to mask out words at random to boost learning of context. Having a similarly performant and versatile way of encoding medical content would be highly desired. So far there is no medical GPT-3 reported.

A less studied field of contrastive and representation learning is concerned with multi-modality in a sense of combining images and textual content. Here, OpenAI recently reported an approach (called CLIP) that creates visual features but with supervision of text data. This resulted in an improved representation as shown by solving a numerous of follow-up classification tasks. This approach is especially interesting in scenarios of zero and few-shot learning, where there exists only little training data per class. A different kind of application of the CLIP architecture was published shortly afterwards. Here, the model needs to be provided with text input and it generates images based on this. This implementation is called DALL-E. A medical flavour of this model (that would theoretically use EHR as an input and then create an image) is not yet published.

A special case of linking image to text data is "image captioning" or "automated creation of radiological reports". However, this lacks the depth to generate a diagnosis for an individual patient and only works one directional. That is, an input image receives a corresponding description. Since it does not utilize recent advances of self-supervised/contrastive learning it is expected to be very limited in scope and domain.

In another sense of the word "multi-modality" one can consider AI models that translate between 2 modalities of Radiological image acquisition—for example, turning CT scans into synthetic MRI counterparts or vice versa. Those scenarios are published in moderate frequency with varying degree of novelty and quality.

By extending the concept of with multi-modality and sparsity handling it becomes a solution that is on par with modern NLP models—but instead for language task, for electronical health records. These high-quality representations can be created from any kind of digital health data.

The Proposed Solution:
  may be well suited for real-world data (rather than curated research data) since it allows ingestion of incomplete data and data from different modalities;
  may circumvent the limitations of expert annotations, since the representation is created in an unsupervised manner;
  since the approach is multi-modal by design it is less prone to domain-specific inconsistency and rather exploits cross-domain concepts (e.g., an X-ray of a broken femur can be leveraged to autocomplete a missing value of age or sex in EHR);
In the proposed solution,
  multimodality allows to integrate several domains while training data point have only partial information (subject 1: EHR+lungCT, subject 2: CT+fMRI, subject N: EHR+X-ray);
  partial information is used in a complementary way and does not meet a minimal content requirement (any data is welcome);
  since images are worth a thousand words and EHR provides clinical context, building a joint representation just "makes sense", because it leads to a complete and detailed representation of a patient's past and current state.
  Just like modern versatile NLP models that solve a myriad of tasks based on one high-quality representation, image+EHR representation can be utilized in multiple ways, including:
    Machine learning models for multimodal representation learning.
    Weakly supervised training: only requirement is that the model receives pairs of records—i.e. an image and an EMR from the same person
    Model details:
      2 encoders, multimodal fusion, two decoders for reconstruction
      Model outputs a single embedding for the multimodal input By Extending Previous Combined Reconstruction and Contrastive Learning Concepts with:
  (1) a 2nd input for non-image data (e.g. EHR),
  (2) context-conditioning by masking parts of EHR and images during training, and
  (3) applying a task conditional learning schedule,
the solution according to the subject matter can have the potential to create a representation that closely links EHR with image data. Similar to the versatility of modern NLP models, combined reconstruction and contrastive learning concepts generated representations can enable or augment various steps in current healthcare routine. Up to now, there is no published technology that creates a high-dimensional representation of medical image jointly with EHR data.

Technically the extended combined reconstruction and contrastive learning concepts approach would consist of at least 2 encoder structures (one for image data and one for textual data). Both data types are then subject to multimodal fusion, which results in a detailed and realistic representation. This representation is created in an unsupervised manner, which takes away a large burden with regard to minimal data requirement. In other words, only little curation effort is needed to leverage real-world data. Once the representation is present 2 decoder structures could generate (synthetic) output, which would eventually be presented to the user as part of an application.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that further elements are present. The term "comprising" is to be understood in an open sense, i.e. in a way that an object that "comprises an element A" may comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

Example Embodiments

Embodiment 1: An apparatus comprising at least one processor and at least one memory including computer program code, the at least one memory and the computer program code configured to, with the at least one processor, cause an apparatus at least to perform and/or control:
  obtaining input text data indicative of at least partially edited source text data for training of a machine learning model and input image data indicative of at least partially edited source image data for training of the machine learning model;
  obtaining test text data indicative of at least partially unedited source text data for training of the machine learning model and test image data indicative of at least partially unedited source image data for training of the machine learning model;
  generating a joint representation of the input text data and the input image data from the input text data and the input image data depending at least on one parameter influencing the machine learning model, wherein the joint representation enables deriving output text data and output image data;
  generating output text data indicative of at least a part of the unedited source text data and output image data indicative of at least a part of the unedited source image data based, at least in part, on the joint representation of the input text data and the input image data, and depending at least on one parameter influencing the machine learning model;
  evaluating the performance of the machine learning model by computing a first loss function indicative of a first deviation between the output text data and the test text data, and
  evaluating the machine learning model by computing a second loss function indicative of a second deviation between the output image data and the test image data.

Embodiment 2: The apparatus of embodiment 1, wherein the at least partly edited source image data comprises at least partially cropped and/or at least partially corrupted source image data wherein corrupting can be one or more of masking, rearranging, distorting, rotating, mirroring, coloring, changing contrast, changing brightness, pixelating, smoothing, and adding noise and/or the at least partly edited source text data comprises at least partially cropped and/or at least partially corrupted source text data wherein corrupting can be one or more of masking, rearranging text parts, deleting text parts, replacing text parts with new text, wherein text parts can be one or more of letters, numbers, words, sentences, paragraphs or pages.

Embodiment 3: The apparatus according to any of the preceding embodiments, wherein the test text data comprises at least partially cropped source data and/or the test image data comprises at least partially cropped source image data.

Embodiment 4: The apparatus according to any of the preceding embodiments, the at least one memory and the computer program code configured to, with the at least one processor, cause the apparatus further to perform:
  changing at least one parameter of the machine learning model to influence the output text data and/or the output image data generated by the machine learning model in order to reduce the first deviation between the output of the first loss function and a desired output of the first loss function and/or the second deviation between the output of the second loss function and a desired output of the second loss function.

Embodiment 5: The apparatus according to any of the preceding embodiments, wherein
  the changing of the at least one parameter of the machine learning model is dependent on the magnitude of the first deviation, in particular on a crossing of a first threshold by the first deviation and/or on the magnitude of the second deviation, in particular on a crossing of a second threshold.

Embodiment 6: The apparatus according to any of the preceding embodiments, wherein
  one or more steps of any of the preceding embodiments are iteratively repeated until a condition, in particular a number of iterations or a threshold-crossing of at least one of the loss function outputs, is met, wherein at least one of the input text data and the input image data is at least partially altered between repetitions.

Embodiment 7: The apparatus according to any of the preceding embodiments, wherein
  the machine learning model comprises an artificial neural network, in particular that changing of the at least one parameter of the machine learning model is achieved by backpropagation.

Embodiment 8: The apparatus according to any of the preceding embodiments, wherein
  the input text data and/or the input image data comprise information about a patient,
  the input text data at least partially represents an electronic medical record of the patient and/or comprises information about vital parameters, physiological measurements, prescribed, recommended and/or other medications, and/or the input image data represents at least one image of at least one body region of the patient, wherein the image was acquired by photography, X-ray radiography, computerized tomography, fluoroscopy, magnetic resonance imaging, functional magnetic resonance imaging, ultrasonography, endoscopy, elastography, tactile imaging, thermography, microscopy, positron emission tomography and/or any other imaging technique.

Embodiment 9: The apparatus according to any of the preceding embodiments, wherein generating a joint representation of both the input text data and the input image data comprises:
- encoding the input text data using a first encoding branch to an encoded representation of the input text data;
- encoding the input image data using a second encoding branch to an encoded representation of the input image data; and
- combining the encoded representation of the input text data and the encoded representation of the input image data to a joint representation of the input text data and the input image data, wherein both, the representation of input text data and the representation of input image data, are vectors, matrices and/or tensors, wherein combining encoded representations preferably comprises one or more of concatenating encoded representations, multiplying encoded representations, adding encoded representations, convoluting encoded representations.

Embodiment 10: The apparatus according to any of the preceding embodiments, wherein generating output text data and output image data from the joint representation of the input text data and the input image data comprises:
- generating the output text data from the joint representation of both the input text data and the input image data using a first decoding branch; and
- generating the output image data from the joint representation of both the input text data and the input image data using a second decoding branch.

Embodiment 11: The apparatus according to any of the preceding embodiments, the at least one memory and the computer program code configured to, with the at least one processor, cause the apparatus further to perform:
- generating a first representation based on first input text data and/or first input image data, the first representation being a representation of the input text data, a representation of the input image data or a joint representation;
- generating a second representation based on second input text data and/or second input image data, the second representation being a representation of the input text data, a representation of the input image data or a joint representation;
- comparing the first representation and the second representation using a representation deviation metric.

Embodiment 12: The apparatus according to any of the preceding embodiments, the at least one memory and the computer program code configured to, with the at least one processor, cause the apparatus further to perform:
- changing at least one parameter of the machine learning model to influence the representation deviation metric in a manner at least partially depending on whether the first input text data and the second input text data stem from the same source text data and/or whether the first input image data and the second input image data stem from the same source image data.

Embodiment 13: A tangible computer-readable medium storing computer program code, the computer program code when executed by a processor causing an apparatus to perform and/or control:
- obtaining input text data indicative of at least partially edited source text data for training of a machine learning model and input image data indicative of at least partially edited source image data for training of the machine learning model;
- obtaining test text data indicative of at least partially unedited source text data for training of the machine learning model and test image data indicative of at least partially unedited source image data for training of the machine learning model;
- generating a joint representation of the input text data and the input image data from the input text data and the input image data depending at least on one parameter influencing the machine learning model, wherein the joint representation enables deriving output text data and output image data;
- generating output text data indicative of at least a part of the unedited source text data and output image data indicative of at least a part of the unedited source image data based, at least in part, on the joint representation of the input text data and the input image data, and depending at least on one parameter influencing the machine learning model;
- evaluating the performance of the machine learning model by computing a first loss function indicative of a first deviation between the output text data and the test text data, and
- evaluating the machine learning model by computing a second loss function indicative of a second deviation between the output image data and the test image data.

Embodiment 14: An apparatus configured to perform and/or control or comprising respective means for performing and/or controlling the method of any of the embodiments 1 to 12.

Embodiment 15: An apparatus comprising at least one processor and at least one memory including computer program code, the at least one memory and the computer program code configured to, with the at least one processor, cause an apparatus at least to perform and/or control the method of any of the embodiments 1 to 12.

The invention claimed is:

1. A method comprising:
   - obtaining input text data indicative of at least partially edited source text data for training of a machine learning model and input image data indicative of at least partially edited source image data for training of the machine learning model;
   - obtaining test text data indicative of at least partially unedited source text data for training of the machine learning model and test image data indicative of at least partially unedited source image data for training of the machine learning model;
   - generating a joint representation of the input text data and the input image data from the input text data and the input image data depending at least on one parameter influencing the machine learning model, wherein the joint representation enables deriving output text data and output image data;
   - generating output text data indicative of at least a part of the unedited source text data and output image data indicative of at least a part of the unedited source image data based, at least in part, on the joint representation of the input text data and the input image data, and depending at least on one parameter influencing the machine learning model;
   - evaluating the performance of the machine learning model by computing a first loss function indicative of a first deviation between the output text data and the test text data, evaluating the machine learning model by computing a second loss function indicative of a second deviation between the output image data and the test image data, and changing at least one parameter of the machine learning model to influence the output text data and/or the output image data generated by the machine learning model in order to reduce the first deviation between the output of the first loss function and a desired output of the first loss function and/or the second deviation between the output of the second loss function and a desired output of the second loss function.

2. The method of claim 1, wherein:

the at least partly edited source image data comprises at least partially cropped and/or at least partially corrupted source image data wherein corrupting is one or more of masking, rearranging, distorting, rotating, mirroring, coloring, changing contrast, changing brightness, pixelating, smoothing, and adding noise and/or the at least partly edited source text data comprises at least partially cropped and/or at least partially corrupted source text data wherein corrupting is one or more of masking, rearranging text parts, deleting text parts, replacing text parts with new text, wherein text parts are one or more of letters, numbers, words, sentences, paragraphs or pages.

3. The method of claim 1, wherein:

the test text data comprises at least partially cropped source data and/or the test image data comprises at least partially cropped source image data.

4. The method of claim 1, wherein:

the changing of the at least one parameter of the machine learning model is dependent on the magnitude of the first deviation crossing a first threshold and/or on the magnitude of the second deviation crossing a second threshold.

5. The method of claim 4, wherein:

the method is iteratively repeated until a number of iterations or a threshold-crossing of at least one of the loss function outputs is met wherein at least one of the input text data and the input image data is at least partially altered between repetitions.

6. The method of claim 1, wherein:

the machine learning model comprises an artificial neural network, wherein changing of the at least one parameter of the machine learning model is achieved by backpropagation.

7. The method of claim 1, wherein:

the input text data and/or the input image data comprise information about a patient, the input text data at least partially represents an electronic medical record of the patient and/or comprises information about vital parameters, physiological measurements, prescribed, recommended and/or other medications, and/or the input image data represents at least one image of at least one body region of the patient, wherein the image was acquired by photography, X-ray radiography, computerized tomography, fluoroscopy, magnetic resonance imaging, functional magnetic resonance imaging, ultrasonography, endoscopy, elastography, tactile imaging, thermography, microscopy, positron emission tomography and/or any other imaging technique.

8. The method of claim 1, wherein generating a joint representation of both the input text data and the input image data comprises:

encoding the input text data using a first encoding branch to an encoded representation of the input text data;

encoding the input image data using a second encoding branch to an encoded representation of the input image data; and combining the encoded representation of the input text data and the encoded representation of the input image data to a joint representation of the input text data and the input image data, wherein both, the representation of input text data and the representation of input image data, are vectors, matrices and/or tensors, wherein combining encoded representations preferably comprises one or more of concatenating encoded representations, multiplying encoded representations, adding encoded representations, convoluting encoded representations.

9. The method of claim 1, wherein generating output text data and output image data from the joint representation of the input text data and the input image data comprises:

generating the output text data from the joint representation of both the input text data and the input image data using a first decoding branch; and generating the output image data from the joint representation of both the input text data and the input image data using a second decoding branch.

10. The method of claim 1, further comprising:

generating a first representation based on first input text data and/or first input image data, the first representation being a representation of the input text data, a representation of the input image data or a joint representation;

generating a second representation based on second input text data and/or second input image data, the second representation being a representation of the input text data, a representation of the input image data or a joint representation; and comparing the first representation and the second representation using a representation deviation metric.

11. The method of claim 1, further comprising:

changing at least one parameter of the machine learning model to influence the representation deviation metric in a manner at least partially depending on whether the first input text data and the second input text data stem from the same source text data and/or whether the first input image data and the second input image data stem from the same source image data.

12. The method of claim 1, further comprising:

providing new input text data and/or new input image data to the machine learning model, wherein the new input text data comprises information about a patient, an electronic medical record of a patient or multiple patients, information about vital parameters, physiological measurements, prescribed, recommended and/or other medications, and/or wherein the new image data represents at least one image of at least one body region of the patient, wherein the image was acquired by photography, X-ray radiography, computerized tomography, fluoroscopy, magnetic resonance imaging, functional magnetic resonance imaging, ultrasonography, endoscopy, elastography, tactile imaging, thermography, microscopy, positron emission tomography and/or any other imaging technique, generating new output text data and/or new output image data using the trained machine learning and/or the apparatus.

13. The method of claim 12, further comprising:
repeating at least the steps of providing the new input text data and/or the new input image data and generating new output text data and/or new output image data at least once while randomly varying the new input text data and/or new input image data,
comparing the new output text data of different repetitions and/or comparing the new output image data of different repetitions,
quantifying the variability between repetitions of parts of the new output image data and/or quantify the variability between repetitions of parts of the new output text data,
identify parts of the new output image data and/or parts of the new output text data that are uncertain based on the quantifying of their variability.

14. An apparatus comprising at least one processor and at least one memory including computer program code, the at least one memory and the computer program code configured to, with the at least one processor, cause the apparatus to:
obtain at least one of input text data and/or input image data, and
generate output text data and/or output image data at least partially using a trained machine learning model, wherein training the machine learning model comprises:
obtaining input text data indicative of at least partially edited source text data for training of the machine learning model and input image data indicative of at least partially edited source image data for training of the machine learning model;
obtaining test text data indicative of at least partially unedited source text data for training of the machine learning model and test image data indicative of at least partially unedited source image data for training of the machine learning model;
generating a joint representation of the input text data and the input image data from the input text data and the input image data depending at least on one parameter influencing the machine learning model, wherein the joint representation enables deriving output text data and output image data;
generating output text data indicative of at least a part of the unedited source text data and output image data indicative of at least a part of the unedited source image data based, at least in part, on the joint representation of the input text data and the input image data, and depending at least on one parameter influencing the machine learning model;
evaluating the performance of the machine learning model by computing a first loss function indicative of a first deviation between the output text data and the test text data,
evaluating the machine learning model by computing a second loss function indicative of a second deviation between the output image data and the test image data, and
changing at least one parameter of the machine learning model to influence the output text data and/or the output image data generated by the machine learning model in order to reduce the first deviation between the output of the first loss function and a desired output of the first loss function and/or the second deviation between the output of the second loss function and a desired output of the second loss function,
wherein:
the output image data is at least partially dependent on the input text data, and/or
the output text data is at least partially dependent on the input image data.

* * * * *